United States Patent
Zhou et al.

(10) Patent No.: US 9,521,561 B2
(45) Date of Patent: Dec. 13, 2016

(54) UE-ASSISTED NETWORK OPTIMIZATION METHODS

(71) Applicant: QUALCOMM Incorporated, San Diego, CA (US)

(72) Inventors: Yan Zhou, San Diego, CA (US); Jay Kumar Sundararajan, San Diego, CA (US); Peerapol Tinnakornsrisuphap, San Diego, CA (US); Mehmet Yavuz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 13/802,014

(22) Filed: Mar. 13, 2013

(65) Prior Publication Data

US 2014/0073317 A1 Mar. 13, 2014

Related U.S. Application Data

(60) Provisional application No. 61/700,832, filed on Sep. 13, 2012.

(51) Int. Cl.
*H04W 28/02* (2009.01)
*H04W 16/32* (2009.01)
(Continued)

(52) U.S. Cl.
CPC ............ *H04W 16/32* (2013.01); *H04L 47/122* (2013.01); *H04W 24/02* (2013.01);
(Continued)

(58) Field of Classification Search
CPC ...... H04W 84/00; H04W 36/22; H04W 24/00; H04W 28/02
(Continued)

(56) References Cited

U.S. PATENT DOCUMENTS 8,503,938 B2 * 8/2013 Laroia ................... H04W 24/08
370/230
2004/0097237 A1 5/2004 Aoyama
(Continued)

FOREIGN PATENT DOCUMENTS

EP 1983698 A1 10/2008
WO 2012112184 A1 8/2012

OTHER PUBLICATIONS

3GPP TSG RAN2 Meeting #68 "Clarification on location information," R2-096601, Huawei, Jeju, Korea, Nov. 9-13, 2009, 13 pages.
(Continued)

*Primary Examiner* — Kamran Afshar
*Assistant Examiner* — Farideh Madani

(57) ABSTRACT

A UE or mobile entity in a wireless communication may assist network optimization by determining a location uncovered by a wireless network, generate a coverage hole detected message if one or more conditions associated with the uncovered location are satisfied, and determining a time to transmit the coverage hole detected message to a covered wireless network. The covered network may act on the message to add covered in a second network so that the second network covers the UE. In other aspects, a UE or mobile entity may detect cell congestion in a first cell and assist the network in offloading congestion from the congested cell. In other aspects, a UE or mobile entity may detect backhaul congestion on a first cell, and assist in offloading backhaul communication for the first cell via a second cell.

20 Claims, 18 Drawing Sheets

(51) Int. Cl.
*H04W 24/02* (2009.01)
*H04W 28/08* (2009.01)
*H04L 12/803* (2013.01)
*H04W 16/08* (2009.01)
*H04W 16/18* (2009.01)

(52) U.S. Cl.
CPC ... *H04W 28/0205* (2013.01); *H04W 28/0289* (2013.01); *H04W 28/08* (2013.01); *H04W 16/08* (2013.01); *H04W 16/18* (2013.01)

(58) Field of Classification Search
USPC .......... 455/423, 453, 425, 67.11, 452.1, 424
See application file for complete search history.

(56) References Cited

U.S. PATENT DOCUMENTS

| | | | |
|---|---|---|---|
| 2007/0142071 A1* | 6/2007 | Hart | H04W 4/10 455/518 |
| 2008/0039112 A1 | 2/2008 | Park | |
| 2008/0161026 A1* | 7/2008 | Wiatrowski | H04W 28/06 455/466 |
| 2008/0242301 A1 | 10/2008 | Osterling et al. | |
| 2009/0203375 A1* | 8/2009 | Gisby | H04W 8/30 455/426.1 |
| 2010/0151920 A1* | 6/2010 | Song | H04W 52/0216 455/574 |
| 2010/0240346 A1 | 9/2010 | Jain et al. | |
| 2011/0096687 A1 | 4/2011 | Doettling et al. | |
| 2011/0190016 A1 | 8/2011 | Hamabe et al. | |
| 2011/0195707 A1* | 8/2011 | Faerber | H04W 24/08 455/423 |
| 2012/0077467 A1* | 3/2012 | Fan | H04W 4/14 455/414.1 |
| 2012/0106383 A1 | 5/2012 | Gormley et al. | |
| 2012/0127876 A1* | 5/2012 | Hunukumbure et al. | 370/252 |
| 2012/0220291 A1 | 8/2012 | Olsson et al. | |
| 2012/0281594 A1* | 11/2012 | Stewart | H04W 16/14 370/259 |
| 2012/0309404 A1 | 12/2012 | Suzuki et al. | |
| 2013/0121764 A1 | 5/2013 | Olson et al. | |
| 2013/0311640 A1* | 11/2013 | Gleixner | H04W 40/246 709/224 |
| 2014/0031030 A1* | 1/2014 | Chou | H04B 7/0469 455/423 |

OTHER PUBLICATIONS

Damnjanovic A., et al., "UE's Role in LTE Advanced Heterogeneous Networks," IEEE Communications Magazine, LTE-Advanced and 4G Wireless Communications, Feb. 2012, pp. 164-176.
International Search Report and Written Opinion—PCT/US2013/059817—ISA/EPO—Jun. 3, 2014.
Nec et al: "UE assistance for self-optimizing of network" , 3GPP Draft; R2-072432, 3rd Generation Partnership Project (3GPP), Mobile Competence Centre; 650, Route Des Lucioles; F-06921 Sophia-Antipolis Cedex; France, vol. RAN WG2, No. Orlando, USA; Jun. 22, 2007, Jun. 22, 2007 (Jun. 22, 2007), XP050135267, pp. 1-4.
3GPP TS 37.320: "3rd Generation Partnership Project, Technical Specification Group Radio Access Network, Universal Terrestrial Radio Access (UTRA) and Evolved Universal Terrestrial Radio Access (E-UTRA), Radio measurement collection for Minimization of Drive Tests (MDT), Overall description", Stage 2, Release 12, V12.2.0, Sep. 2014, 25 pages.

* cited by examiner

UE-ASSISTED NETWORK OPTIMIZATION METHODS

CROSS-REFERENCE TO RELATED APPLICATION

This application for claims priority under 35 U.S.C. §119(e) to provisional application Ser. No. 61/700,832, filed Sep. 13, 2012, which application is assigned to the assignee hereof and expressly incorporated by reference herein in its entirety.

BACKGROUND

Field

The present disclosure relates to communication systems and to techniques for UE-assisted network optimization.

Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink (DL) and uplink (UL). The DL (or forward link) refers to the communication link from the base station to the UE, and the UL (or reverse link) refers to the communication link from the UE to the base station.

The 3rd Generation Partnership Project (3GPP) Long Term Evolution (LTE) evolves cellular technology based on Global System for Mobile communications (GSM) and Universal Mobile Telecommunications System (UMTS). The LTE physical layer (PHY) provides a highly efficient way to convey both data and control information between base stations, such as an evolved Node Bs (eNBs), and mobile entities, such as UEs.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, and small-coverage base stations (e.g., picocells and femtocells).

The Femto Forum, a non-profit membership organization focused on standardization and promotion of femtocell solutions, defines femto access points (FAPs), also referred to as femtocell units, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home node B (HNB), home e-node B (HeNB), access point base station, or other terminology. Heterogeneous networks including macrocell and small cell base stations pose various challenges and opportunities for providing consistent coverage and managing communications load among different cells, backhauls and networks. It is desirable to develop new technologies to meet these challenges and take advantage of new opportunities.

SUMMARY

Methods, apparatus and systems for UE-assisted network optimization in wireless communication network are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a method operable by a communication device for wireless communication service may include determining a location uncovered by a wireless network, generating a coverage hole detected message if one or more conditions associated with the uncovered location are satisfied, and determining a time to transmit the coverage hole detected message to a covered wireless network. The coverage hole may be detected without having or losing a connection to the wireless network in which the coverage hole exists.

In an aspect, the communication device includes at least one of a network node or a mobile node. In another aspect, the wireless network associated with the uncovered location has a unique network identity and includes one or both of a public land mobile network and a WiFi network. In the foregoing method, a location may be considered uncovered by a network if an associated network signal strength is below a first threshold and/or service quality including data throughput measured at the communication device is below a second threshold.

In another aspect, the coverage hole detected message comprises at least an uncovered network identity and uncovered location information. In another aspect, the one or more conditions for generating the coverage hole detected message may include traffic demand of the communication device at the uncovered location being above a first threshold, and/or duration of the communication device staying at the uncovered location being above a second threshold. The traffic demand may be measured, for example, by a number of calls initiated at the uncovered location. The duration that the communication device stays at the uncovered location may be estimated via the communication device's accelerometer, GPS, and/or connected small cell identities.

In another aspect of the method, a time at which to transmit the message may be determined based on one or more of the following criteria: battery life of the communication device being above a threshold, and the covered wireless network being detected by the communication device. Determining the time at which to transmit may include determining based on a time associated with a typically low load at the covered wireless network.

The present disclosure also relates to UE-assisted congestion offloading and UE-assisted backhaul traffic offloading. In UE-assisted congestion offloading, a communication device (e.g., UE or mobile device) may perform a method including determining congestion of a first network node, and sending a cell congestion detected message to at least one other network node. The communication device may include at least one of a network node or a mobile node. Determining the congestion may include determining a system resource usage above a threshold or a congestion state in a broadcast message. The method may include sending the cell congestion detected message only to network nodes not in congestion. The cell congestion detected message may include a congested cell identity, a congestion reason, and/or suggested actions.

In UE-assisted backhaul traffic offloading, a communication device (e.g., UE or mobile device) may perform a method including determining congestion of a first network node, requesting bandwidth from a second network node upon determining congestion of the first network node, and relaying data from the first network node to the second network node upon receiving an acknowledgement for bandwidth from the second network node. The communication device may include at least one of a network node or a mobile node. Determining the congestion may include determining a system resource usage above a threshold or a congestion state in a broadcast message. The method may further include sending a message to the first network node to query whether the first network node desires data relay, wherein the requesting bandwidth is based upon a positive acknowledge for data relay from the first network node.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such as an access terminal, for example a UE or mobile entity, or an access point, for example a macrocell or femtocell. Similarly, an article of manufacture may be provided, including a computer-readable storage medium holding encoded instructions, which when executed by a processor, cause a computer to perform the methods and aspects of the methods as summarized above.

DETAILED DESCRIPTION

Techniques for interference management in a wireless communication system are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink (DL) and SC-FDMA on the uplink (UL). UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (WiFi), Hiperlan, etc.

The techniques described herein may be used for the wireless networks and radio technologies mentioned above as well as other wireless networks and radio technologies. For clarity, certain aspects of the techniques are explained in the exemplary context of 3GPP networks, and more particularly in the context of the interference management for such networks. The word "exemplary" is used herein to mean "serving as an example, instance, or illustration." Any embodiment described herein as "exemplary" is not necessarily to be construed as preferred or advantageous over other embodiments.

Figure 1:
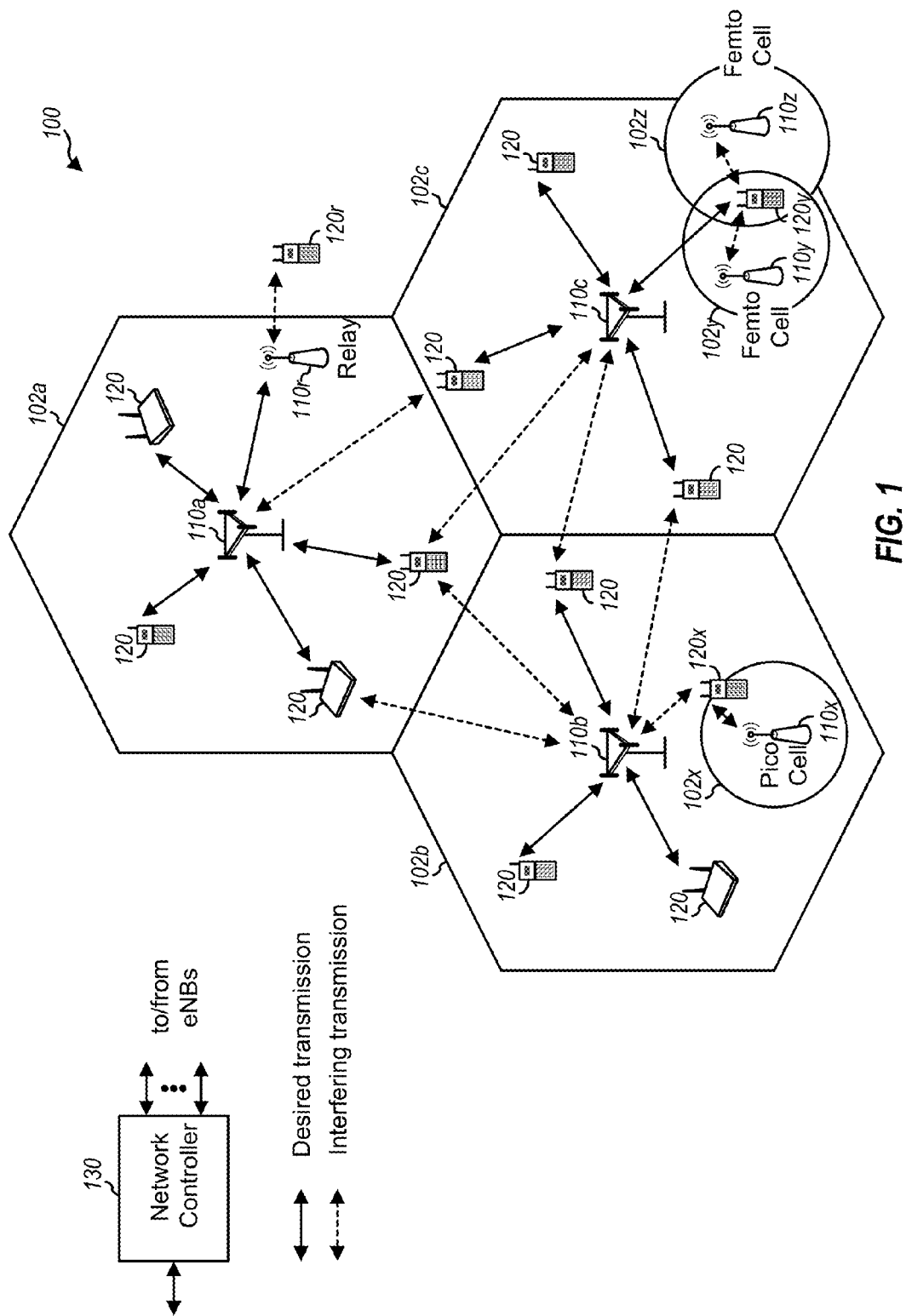
FIG. 1 is a block diagram conceptually illustrating an example of a telecommunications system.

FIG. 1 shows a wireless communication network 100, which may be an LTE network or some other wireless network (e.g., a 3G network or the like). Wireless network 100 may include a number of evolved Node Bs (eNBs) 110a-c and other network entities. An eNB may be an entity that communicates with mobile entities (e.g., user equipment (UE) and may also be referred to as a base station, a Node B, an access point, or other terminology. Although the eNB typically has more functionalities than a base station, the terms "eNB" and "base station" are used interchangeably herein. Each eNB 110a-c may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a picocell, a femtocell, and/or other types of cell. A macro cell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having association with the femtocell (e.g., UEs in a Closed Subscriber Group (CSG), or closed access). In the example shown in FIG. 1, eNBs 110a, 110b, and 110c may be macro eNBs for macro cell groups 102a, 102b, and 102c, respectively. Each of the cell groups 102a, 102b, and 102c may include a plurality (e.g., three) of cells or sectors. An eNB 110x may be a pico eNB for a picocell 102x. An eNB 110y may be a femto eNB or femto access point (FAP) for a femtocell 102y, which may have an overlapping or non-overlapping coverage area with an adjacent femtocell 102z of femto eNB 110z.

Wireless network 100 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 130 may couple to a set of eNBs and may provide coordination and control for these eNBs. Network controller 130 may include a single network entity or a collection of network entities. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 100 may support operation on a single carrier or multiple carriers for each of the DL and UL. A carrier may refer to a range of frequencies used for communication and may be associated with certain characteristics. Operation on multiple carriers may also be referred to as multi-carrier operation or carrier aggregation. A UE may operate on one or more carriers for the DL (or DL carriers) and one or more carriers for the UL (or UL carriers) for communication with an eNB. The eNB may send data and control information on one or more DL carriers to the UE. The UE may send data and control information on one or more UL carriers to the eNB. In one design, the DL carriers may be paired with the UL carriers. In this design, control information to support data transmission on a given DL carrier may be sent on that DL carrier and an associated UL carrier. Similarly, control information to support data transmission on a given UL carrier may be sent on that UL carrier and an associated DL carrier. In another design, cross-carrier control may be supported. In this design, control information to support data transmission on a given DL carrier may be sent on another DL carrier (e.g., a base carrier) instead of the given DL carrier.

Wireless network 100 may support carrier extension for a given carrier. For carrier extension, different system bandwidths may be supported for different UEs on a carrier. For example, the wireless network may support (i) a first system bandwidth on a DL carrier for first UEs (e.g., UEs supporting LTE Release 8 or 9 or some other release) and (ii) a second system bandwidth on the DL carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 100 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 100 may support single-user (SU) MIMO, multi-user (MU) MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 100 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 100 may utilize frequency division duplex (FDD) or time division duplex (TDD). For FDD, the DL and UL may be allocated separate frequency channels, and DL transmissions and UL transmissions may be sent concurrently on the two frequency channels. For TDD, the DL and UL may share the same frequency channel, and DL and UL transmissions may be sent on the same frequency channel in different time periods.

Figure 2:
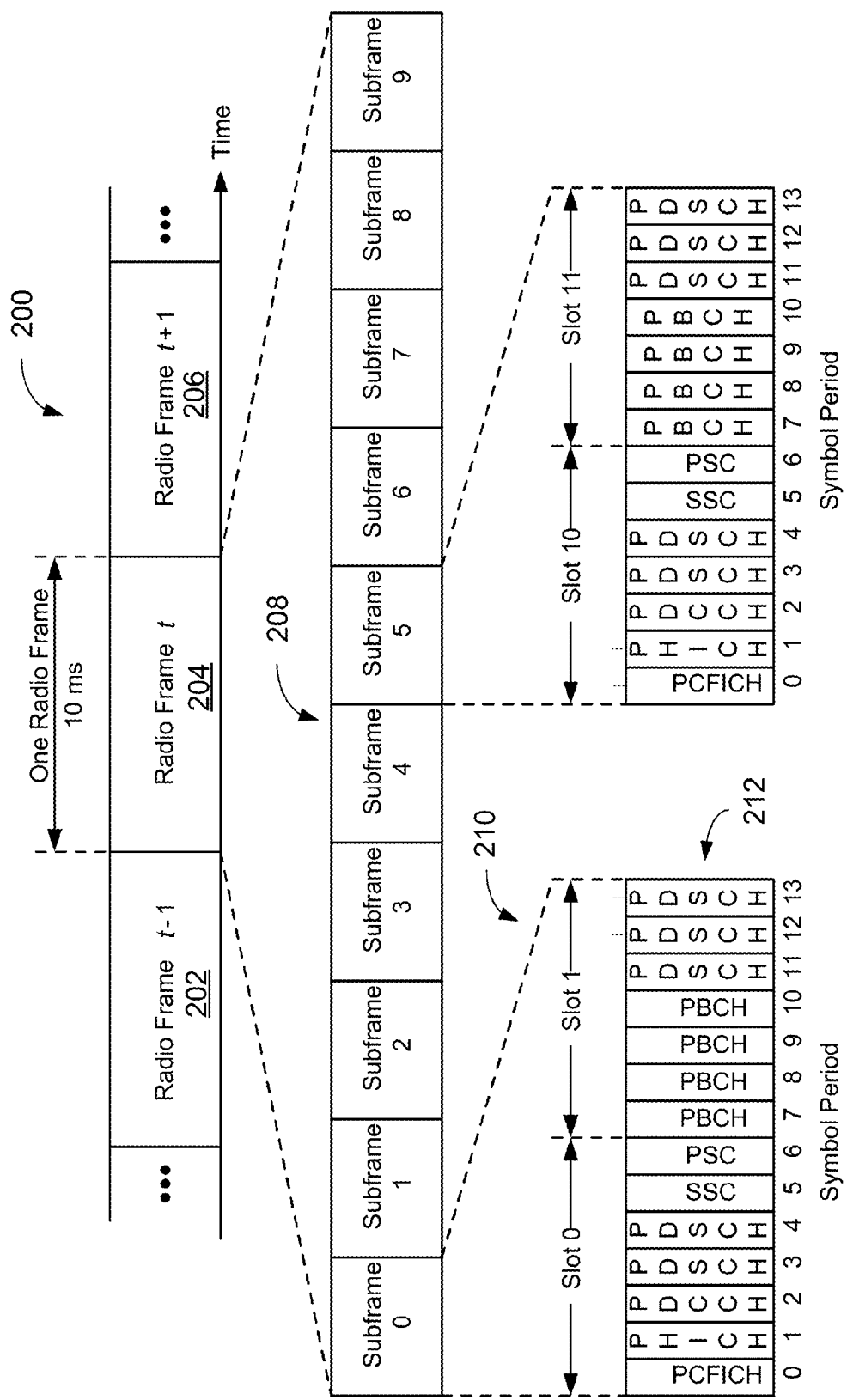
FIG. 2 is a block diagram conceptually illustrating an example of a down link frame structure in a telecommunications system.

FIG. 2 shows a down link frame structure 200 used in LTE. The transmission timeline for the downlink may be partitioned into units of radio frames 202, 204, 206. Each radio frame may have a predetermined duration (e.g., 10 milliseconds (ms) and may be partitioned into ten subframes 208 with indices of 0 through 9. Each subframe may include two slots 210. Each radio frame may thus include twenty slots with indices of 0 through 19. Each slot may include L symbol periods 212, e.g., 7 symbol periods for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), or similar criteria.

Figure 3:
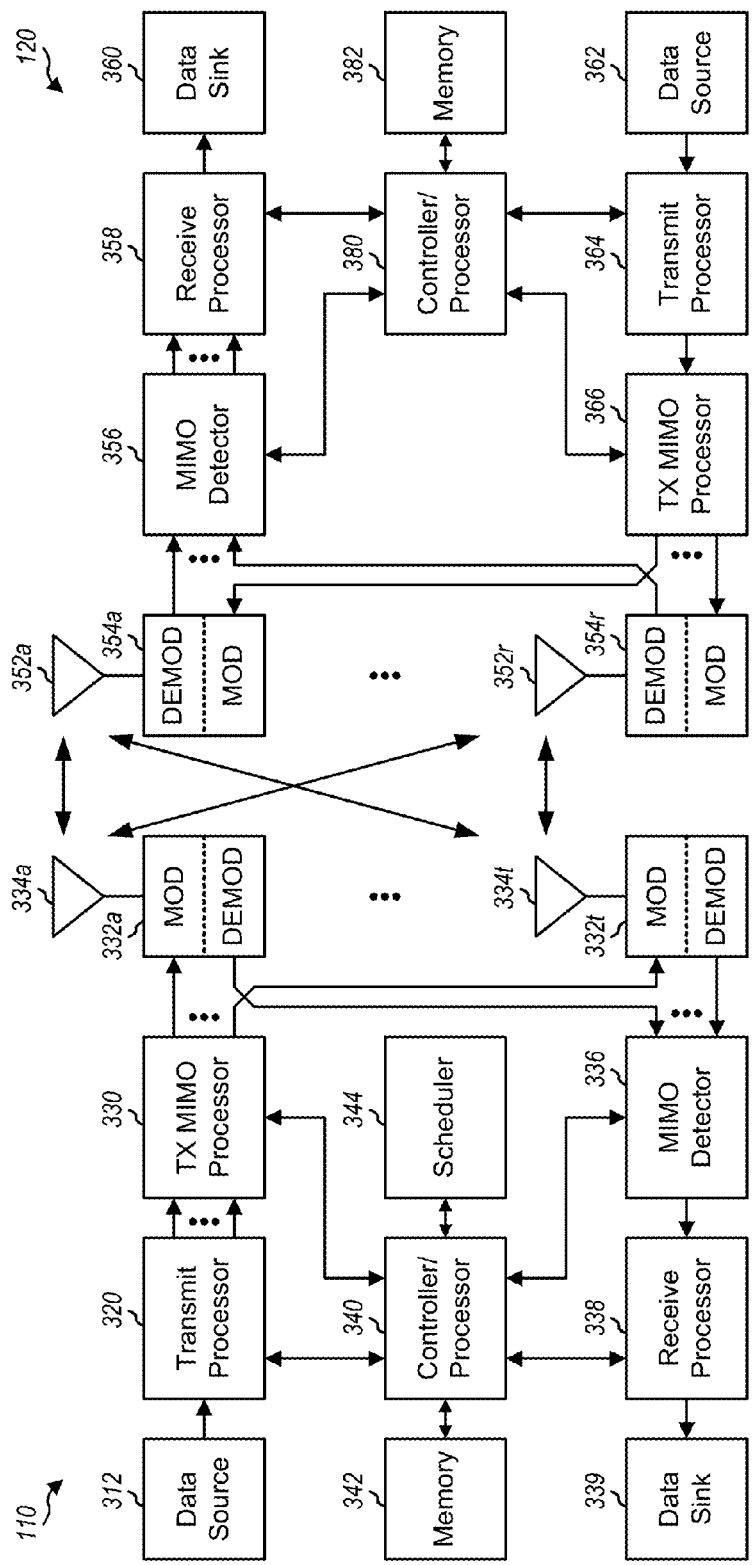
FIG. 3 is a block diagram conceptually illustrating a design of a base station/eNB and a UE.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type such as an access point including a femtocell, a picocell, etc. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, or other channel. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM or other encoding method) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (FIGS) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 7, 8, 10, 11, 13 and/or 14, and/or other processes for the techniques described herein. The memories 342 and 382 may store data and program codes for the base station 110 and the UE 120, respectively. A scheduler 344 may schedule UEs for data transmission on the downlink and/or uplink.

In one configuration, for example, the UE 120 for wireless communication may include means for determining a location uncovered by a wireless network, means for generating a coverage hole detected message if one or more conditions associated with the uncovered location are satisfied, and means for determining a time to transmit the coverage hole detected message to a covered wireless network. The means for determining the coverage hole may be configured so that the coverage hole can be detected without having or losing a prior connection to the wireless network in which the coverage hole exists. In one aspect, the aforementioned means may include the processor(s), the controller/processor 380, the memory 382, the receive processor 358, the MIMO detector 356, the demodulators 354a, and the antennas 352a configured to perform the functions recited by the aforementioned means. In another aspect, the aforementioned means may be a module or any apparatus configured to perform the functions recited by the aforementioned means.

Figure 4:
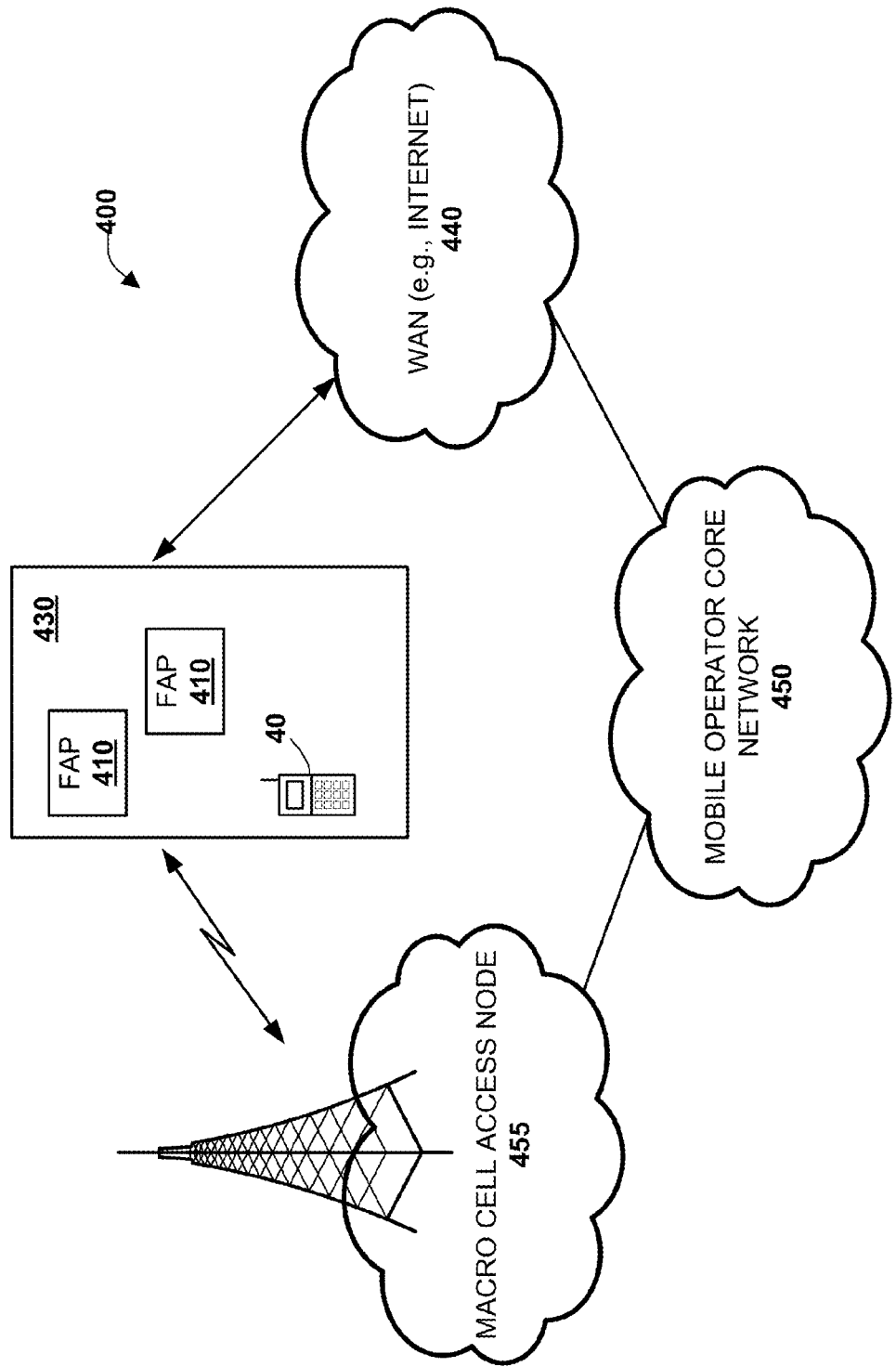
FIG. 4 is a block diagram illustrating another example communication system.

FIG. 4 is an illustration of a planned or semi-planned (e.g, partially ad-hoc) wireless communication environment 400, in accordance with various aspects. Communication environment 400 includes multiple access point base stations, including FAPs 410, each of which are installed in corresponding small scale network environments. Examples of small scale network environments can include user residences, places of business, indoor/outdoor facilities 430, and so forth. The FAPs 410 can be configured to serve associated UEs 40 (e.g., included in a CSG associated with FAPs 410), or optionally alien or visitor UEs 40 (e.g., UEs that are not configured for the CSG of the FAP 410). Each FAP 410 is further coupled to a wide area network (WAN) (e.g., the Internet 440) and a mobile operator core network 450 via a DSL router, a cable modem, a broadband over power line connection, a satellite Internet connection, or the like.

To implement wireless services via FAPs 410, an owner of the FAPs 410 subscribes to mobile service offered through the mobile operator core network 450. Also, the UE 40 can be capable to operate in a macro cellular environment and/or in a residential small scale network environment, utilizing various techniques described herein. Thus, at least in some disclosed aspects, FAP 410 can be backward compatible with any suitable existing UE 40. Furthermore, in addition to the macro cell mobile network 455, UE 40 is served by a predetermined number of FAPs 410, specifically FAPs 410 that reside within a corresponding user residence(s), place(s) of business, or indoor/outdoor facilities 430, and cannot be in a soft handover state with the macro cell mobile network 455 of the mobile operator core network 450. It should be appreciated that although aspects described herein employ 3GPP terminology, it is to be understood that the aspects can also be applied to various technologies, including 3GPP technology e.g., Release (Rel) 9, Rel5, Rel6, Rel7), 3GPP2 technology (1xRTT, 1xEV-DO Rel0, RevA, RevB), and other known and related technologies.

Figure 5:
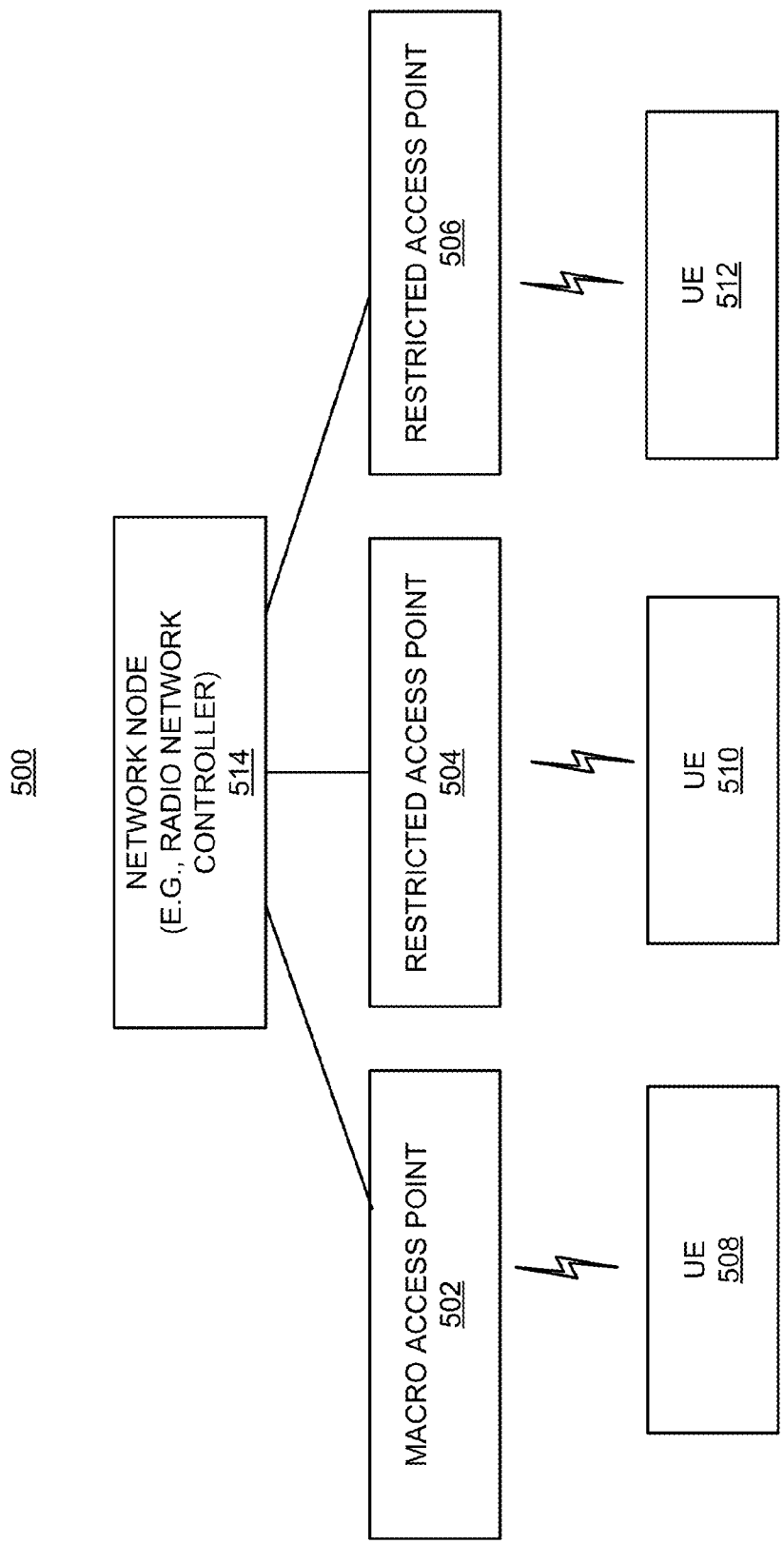
FIG. 5 is a simplified block diagram of several sample aspects of a communication system.

FIG. 5 illustrates sample aspects of a communication system 500 where distributed nodes (e.g., access points 502, 504, and 506) provide wireless connectivity for other nodes (e.g., UEs 508, 510, and 512) that may be installed in or that may roam throughout an associated geographical area. In some aspects, the access points 502, 504, and 506 may communicate with one or more network nodes (e.g., a centralized network controller such as network node 514) to facilitate WAN connectivity.

An access point, such as access point 504, may be restricted whereby only certain mobile entities (e.g., UE 510) are allowed to access the access point, or the access point may be restricted in some other manner. In such a case, a restricted access point and/or its associated mobile entities (e.g., UE 510) may interfere with other nodes in the system 500 such as, for example, an unrestricted access point (e.g., macro access point 502), its associated mobile entities (e.g., UE 508), another restricted access point (e.g., access point 506), or its associated mobile entities (e.g., UE 512). For example, the closest access point to a given UE may not be the serving access point for the given UE.

In some cases, the UE 510 may generate measurement reports (e.g., on repeated basis). In some aspects, such a measurement report may indicate which access points the UE 510 is receiving signals from, a received signal strength indication associated with the signals from each access point (e.g., Ec/Io), the PL to each of the access points, or some other suitable type of information. In some cases a measurement report may include information relating to any load indications the UE 510 received via a DL. The network node 514 may then use the information from one or more measurement reports to determine whether the access point 504 and/or the UE 510 are relatively close to another node (e.g., another access point or UE).

In some cases, the UE 510 may generate information that is indicative of the signal to noise ratio (e.g., signal and interference to noise ratio, SINR) on a DL. Such information may comprise, for example a channel quality indication ("CQI"), a data rate control ("DRC") indication, or some other suitable information. In some cases, this information may be sent to the access point 504 and the access point 504 may forward this information to the network node 514 for use in interference management operations. In some aspects, the network node 514 may use such information to determine whether there is interference on a DL or to determine whether interference in the DL is increasing or decreasing.

As discussed above, an eNB may provide communication coverage for a macro cell, a picocell, a femtocell, and/or other types of cell. Capacity offload gains of a femtocell network are maximized when femtocells are deployed on a dedicated carrier, and thus, there is no interference from a macro network on the same channel as the deployed femtocells. However, because bandwidth is such a scarce resource, bandwidth needs to be allocated and managed with great care and efficiency. Accordingly, an operator may decide if and/or when to dedicate a carrier to femtocells to maximize the capacity of the network.

In accordance with one or more embodiments of the present disclosure, there are provided techniques for UE-assisted network optimization. UE-assisted network optimization methods may include eliminating system coverage holes, relieving cell congestion, and facilitating inter-cell backhaul sharing. The methods are described in more detail below.

UE-Assisted Coverage Hole Detection and Elimination

Figure 6A:
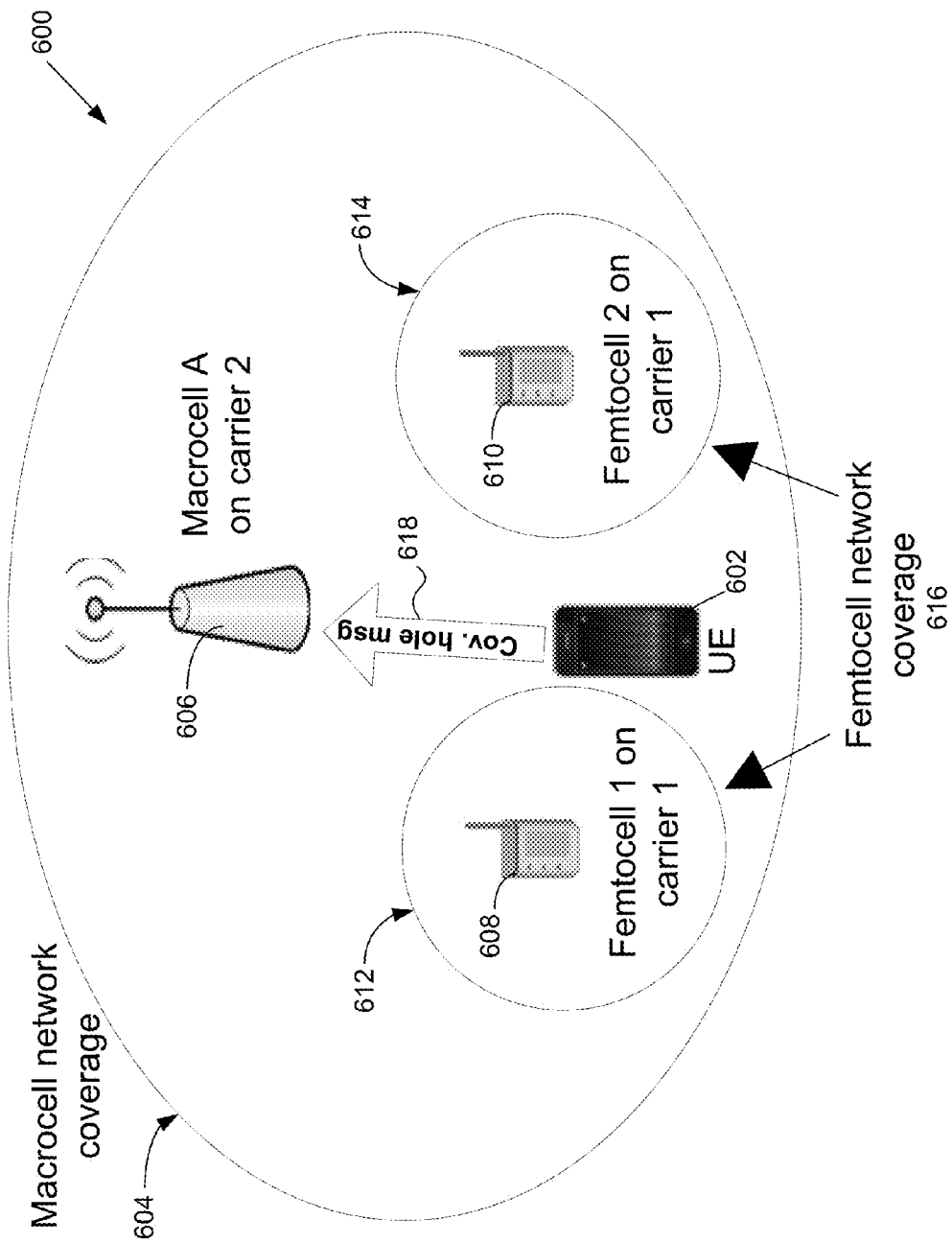
FIGS. 6A-B illustrate UE-assisted coverage hole detection and elimination.
Figure 6B:
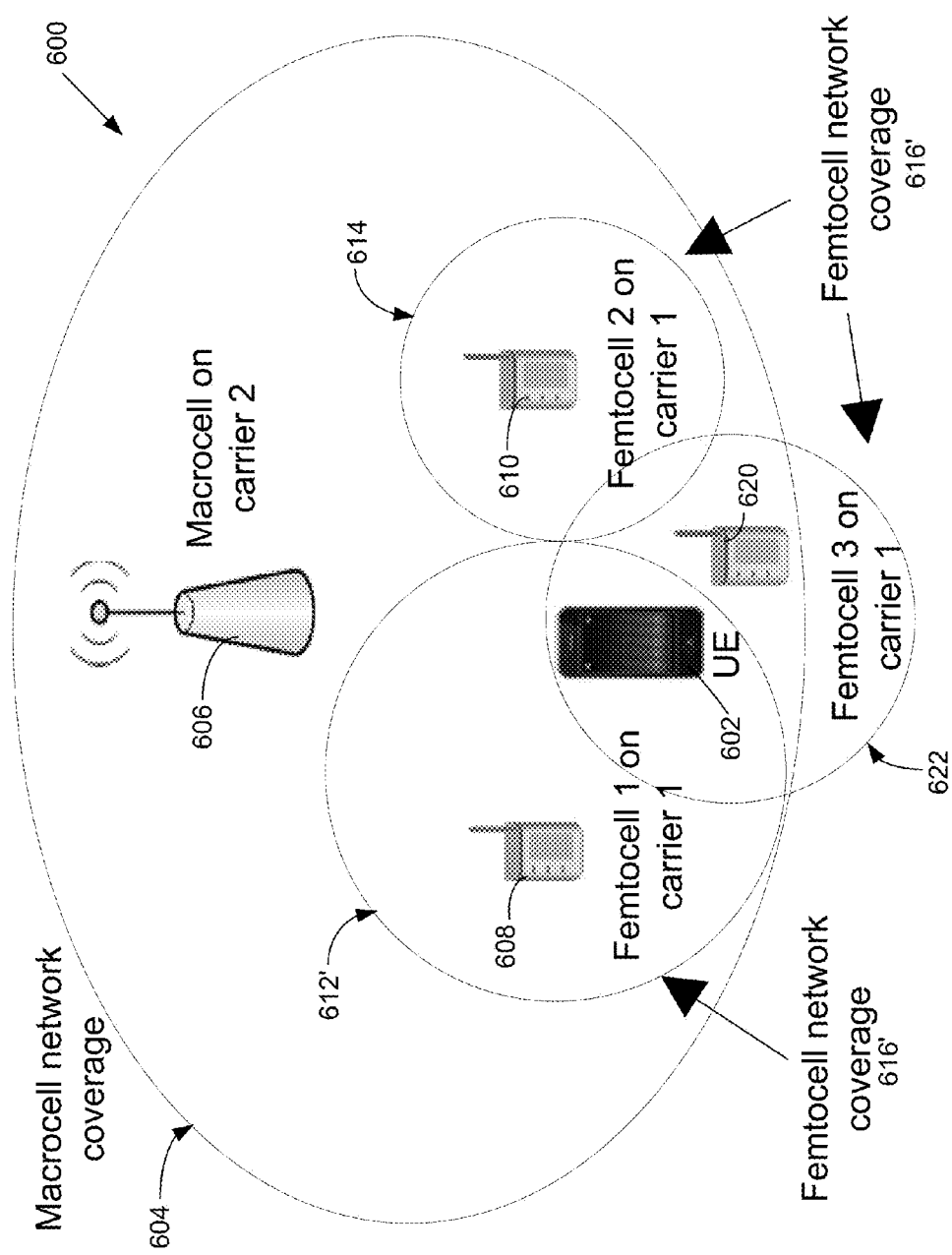

FIGS. 6A-B illustrate UE-assisted coverage hole detection and elimination. In the presence of multiple wireless networks, a UE may detect a coverage hole of one network without being connected to or losing a connection to the network, and report the coverage hole to neighboring cells via covered networks. A coverage hole may be a gap in coverage provided by one or more networks. Coverage may exist from another network node, but a coverage hole may nevertheless exist because the location may be, but is not currently, served by additional network nodes.

A network providing coverage for a location may be considered a covered network; a network not providing coverage for a location may be considered an uncovered network. For example, a location may be near a macrocell and a femtocell. The macrocell may provide service coverage for the location, while the femtocell coverage area may be just outside of the location. In this case the macrocell is a node in a covered network because the macrocell provides coverage for the location. The femtocell is a node in an uncovered network because the femtocell, e.g., in the vicinity of the location, does not provide coverage for the location. Uncovered networks may have unique network identifiers. The first femtocell and the second femtocell may be part of a public land mobile network (PLMN) or a WiFi network.

The method for detecting and eliminating coverage holes may be performed automatically without the aid of a technician searching for the coverage hole. In this way, the uncovered network may be healed (i.e., extend its coverage) autonomously by the covered network with the assistance of the UE. In addition, it is not necessary that the UE that detects the coverage hole be connected to the uncovered network or lose any connection to the uncovered network, to detect the coverage hole.

Referring to FIG. 6A, in system 600 the UE 602 is in a macrocell coverage area 604, served by the macrocell 606 on carrier 2. Two femtocells, a first femtocell 608 and a second femtocell 610, are in the vicinity of the UE 602. A first coverage area 612 of the first femtocell 608 and a second coverage area 614 of the second femtocell 610 both do not include the location of the UE 602. Thus, the UE 602 is outside of the network coverage 616. In other words, a coverage hole exists with respect to the UE 602 and an uncovered network including the first femtocell 608 and the second femtocell 610. In the illustrated system 600, at the location of the UE 602, the macrocell 606 is in a covered network while the first femtocell and the second femtocell form an uncovered network.

While the UE 602 detects the presence of the first femtocell 608 and the second femtocell 614, the UE is outside of the coverage area 616 of both femtocells. The UE 602 may determine that it is not covered by a femtocell by detecting the signal strength and/or service quality, e.g., data throughput, is below a threshold needed for wireless communication. The UE 602 may detect the signal strength below one threshold, and/or the service quality below another threshold. One or both thresholds maybe used for determining whether the network is an uncovered network. Once the UE determines the coverage hole exists, the UE generates a "coverage hole detected" message 618 that may include the UE's location information and the identifier (ID) of the uncovered network or networks.

To conserve resources, the UE 602 may determine to generate the message 618 based on a set of criteria, wherein the criteria are designed to prevent generation of the message 618 in some circumstances and permit generation in other circumstances. The criteria may include a current demand level, for determining whether the UE 602 has sufficient demand for the uncovered network around the location. A current demand criteria may be based on, for example, a threshold number of calls for determining whether the UE has initiated at least a predetermined number of calls around this location within a recent time period. For further example, the criteria may be based on current position, velocity and/or usage history, for determining whether the UE is likely to stay at the uncovered location for at least a predetermined time duration. The location and stationary state of the UE 602 may be determined, for example, based on UE accelerometer, GPS, and/or the UE's camped small cell ID.

The UE 602 then selects a time to send the message 618 to one or more cells in the covered network. To conserve resources, the UE 602 may decide to send the message 618 based on a set of criteria. The criteria may include a minimum battery level for determining if the UE has sufficient battery power. The criteria may include a maximum network load for determining when network load is low for the cells in the covered network. The cell load may be determined at the UE 602 via the cell broadcast information or estimated directly by the UE. For example, the UE 602 may use a predetermined time when the networks normally have low cell load, for sending the message. For example, the time may be 3 AM local time.

One or more network nodes 606 in the covered network may receive the report 618 from the UE. After receiving the report, the cells in the covered networks may locate the cells 608, 610 near the uncovered location in the uncovered network or networks as indicated in the message 618. The covered network may instruct one or more of those cells 608, 610 to increase their transmit power. The cell location may be determined by a node of the covered network or networks, for example by checking a cell location server or based on the network listening function on the cell side. In addition or in the alternative, one or more nodes in the covered network or networks may inform a system managing center to add one or more additional cells near the UE in the uncovered networks.

In the example illustrated in FIG. 6A, the UE 602 is in the vicinity of macrocell A 606, the first femtocell 608, and the second femtocell 610, and within the coverage area 604 of macrocell A 606. However, the UE 602 is outside of the coverage areas 612, 614 of the first femtocell and the second femtocell. Thus, the first femtocell 608 and the second femtocell 610 if in the same network are nodes in an uncovered network. The UE 602 may detect the presence of the first femtocell 608 and the second femtocell 610 by determining that the signal strength and/or service quality of both the first femtocell and the second femtocell are below predetermined thresholds. The UE may perform this determination and act upon it without first losing a connection to any node of the uncovered network. In other words, detection of the uncovered network by the UE is not necessarily predicated on any prior connection between the US and any node of the uncovered network. Upon detecting the uncovered network and determining to take action, the UE 602 may inform macrocell A 606 of the uncovered network using the message 618.

If certain criteria are not met, the UE 602 may determine not to take action upon detecting the uncovered network. For example, the UE 602 may determine that only one call was placed from the uncovered location during a recent time period, which number of calls is below a threshold, e.g., five, and the UE has not been in the location for a predetermined duration. In this case, the UE does not generate a "coverage hole detected" message and does not report the coverage gap. Conversely, if the UE has remained in the same location for longer than a predetermined duration, e.g., for a day, the UE may determine that there is sufficient interest for coverage at the location of the UE. Therefore, the UE 602 may generate a "coverage hole detected" message 618 including its location information and the IDs for the first femtocell 608 and the second femtocell 610.

The UE 602 determine a specific time to transmit the message 618. For example, the UE may select a predetermined time, for example 3 AM daily, to send the message 618, and wait until that time to send the message. In an alternative, or in addition, the UE 602 may determine, from broadcast information received from macrocell A 606, that macrocell A 606 is currently experiencing low traffic load and transmit the message 618 immediately or without waiting for a predetermined time of day. Macrocell A 606 may then receive the message 618 including the location information for the UE and the IDs for the first femtocell 608 and the second femtocell 610. Macrocell A 606 may determine that one or more of the first femtocell 606 and the second femtocell 610 are capable of providing coverage to the UE. Accordingly, Macrocell A 606 may send instructions to the first femtocell 608 and/or the second femtocell 610 to increase transmit power. The first femtocell 608 may increase its transmit power and its corresponding coverage area 612 increases to become expanded coverage area 612' encompassing the UE 602, illustrated in FIG. 6B. The second femtocell 610 may be, for example, operating at its maximum transmit power and therefore cannot increase its transmit power. The UE 602 may establishes a connection to the first femtocell 608 and begin communications via the first femtocell 608.

In another aspect, both the first femtocell 608 and the second femtocell 610 may be incapable of increasing their transmit power, or a power increase may not be desirable for other reasons. In such cases, for example, Macrocell A 606 may receive an indication from the first femtocell 608 and the second femtocell 610 that they have reached their maximum transmit power. Accordingly, Macrocell A 606 may send a message to a system managing center to add an additional cell to provide coverage. The network operator may deploy or activate additional (third) femtocell 620 near the location of the UE 602. The coverage area 622 of the third femtocell 620 may encompass the UE 602. The UE 602 may establish a connection with the third femtocell 620 and begin communications via it.

Figure 7:
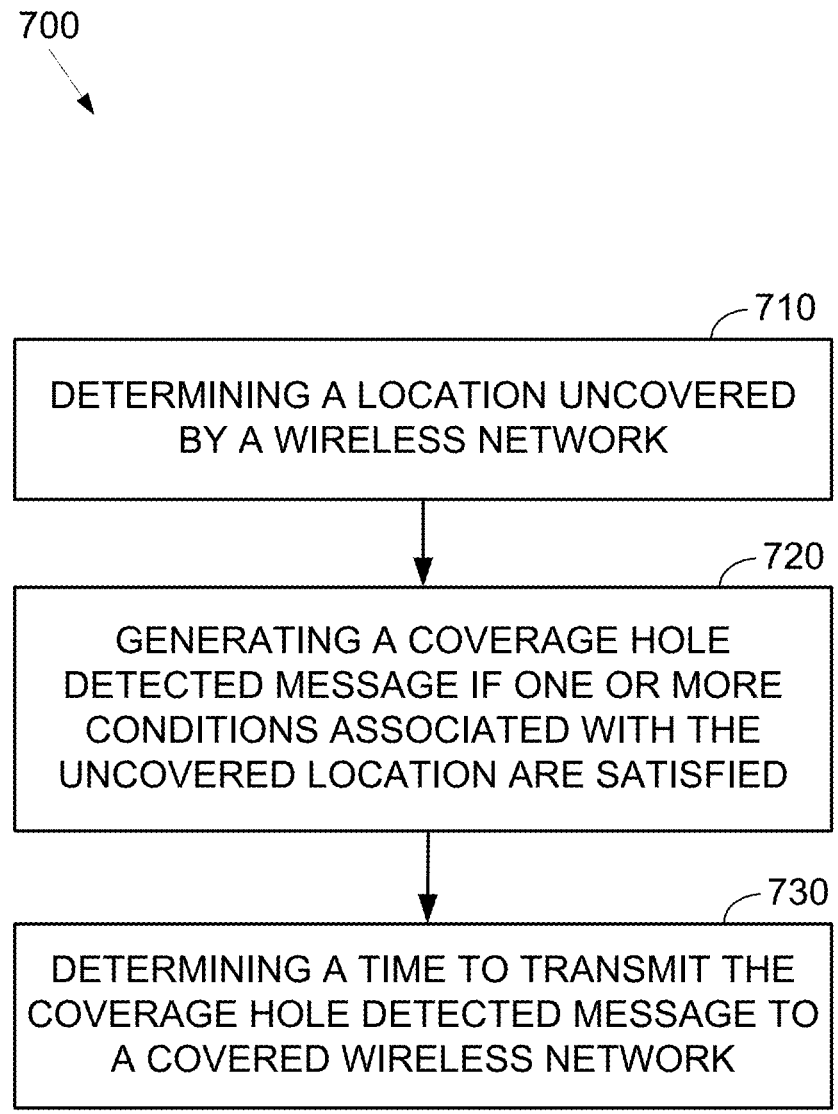
FIG. 7 illustrates an exemplary methodology for UE-assisted coverage hole detection and elimination performed by the UE.

In accordance with the one or more aspects of the embodiments described herein (e.g., FIGS. 6A-B), with reference to FIG. 7, there is shown a methodology 700, operable by a mobile entity, such as, for example, a UE, a mobile station, a terminal, an access terminal, a subscriber unit, a station, or the like. Specifically, method 700 describes a procedure for coverage hole detection and elimination by the mobile entity. The method 700 may involve, at 710, determining a location uncovered by a wireless network. The determining 710 may be performed without having, or first losing, a prior connection between the mobile entity or the like that performs the determination and the wireless network. For example, the mobile entity or the like may make the determination based on a signal strength from the wireless network being below a threshold required for wireless communication. The method 700 may involve, at 720, generating a coverage hole detected message if one or more conditions associated with the uncovered location are satisfied. The method 700 may involve, at 730, determining a time to transmit the coverage hole detected message to a covered wireless network.

Figure 8:
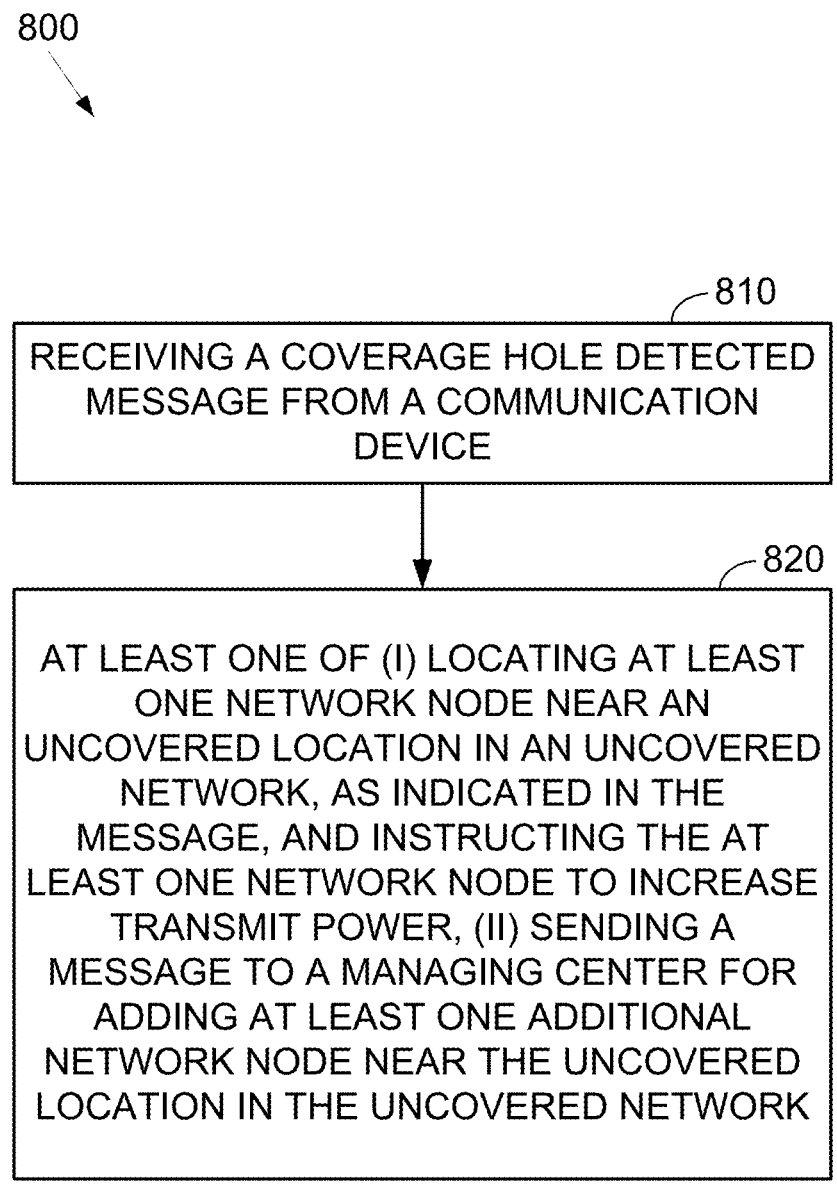
FIG. 8 illustrates aspects of an exemplary methodology for UE-assisted coverage hole detection and elimination performed by a network entity.

In accordance with the one or more aspects of the embodiments described herein (e.g., FIGS. 6A-B) with reference to FIG. 8, there is shown a methodology 800, operable by a network entity, such as, for example, a femcocell, a macrocell, a picocell, etc. Specifically, method 800 describes a procedure for coverage hole detection and elimination by the network entity. The method 800 may involve, at 810, receiving a coverage hole detected message from a communication device, for example, a UE. The method 800 may involve, at 820, at least one of (i) locating at least one network node near an uncovered location in an uncovered network, as indicated in the message, and instructing the at least one network node to increase transmit power, or (ii) sending a message to a managing center for adding at least one additional network node near the uncovered location in the uncovered network.

UE-Assisted Cell Congestion Detection and Elimination

Figure 9A:
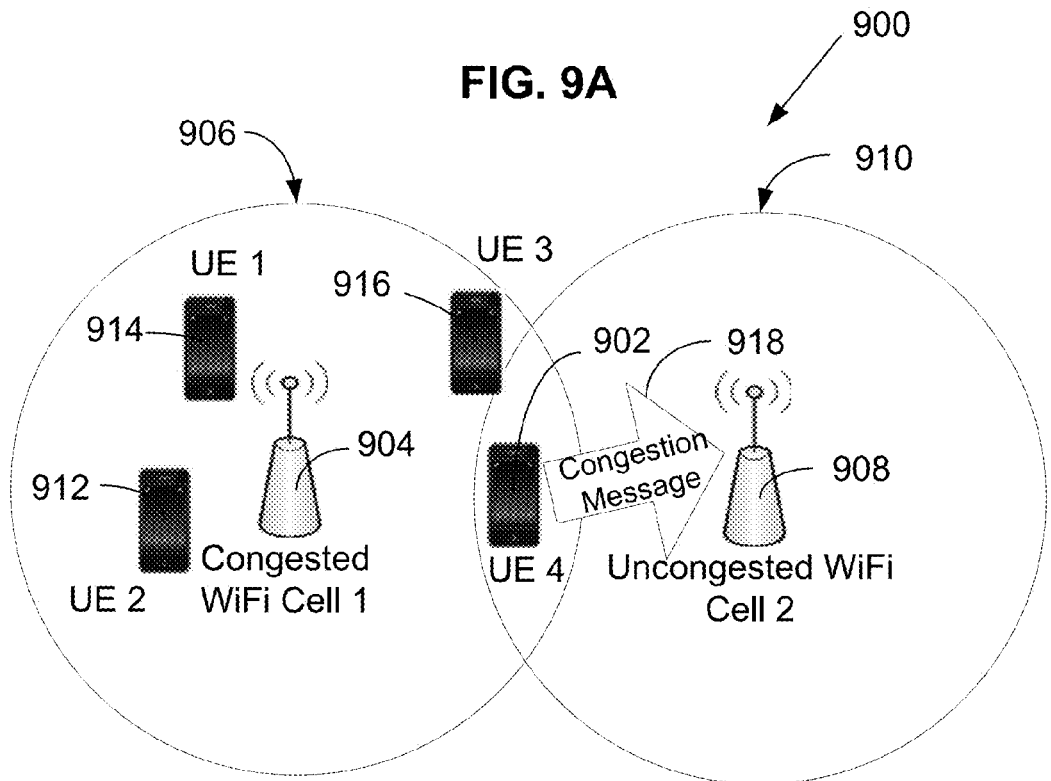
FIGS. 9A-B illustrate UE-assisted cell congestion detection and elimination.
Figure 9B:
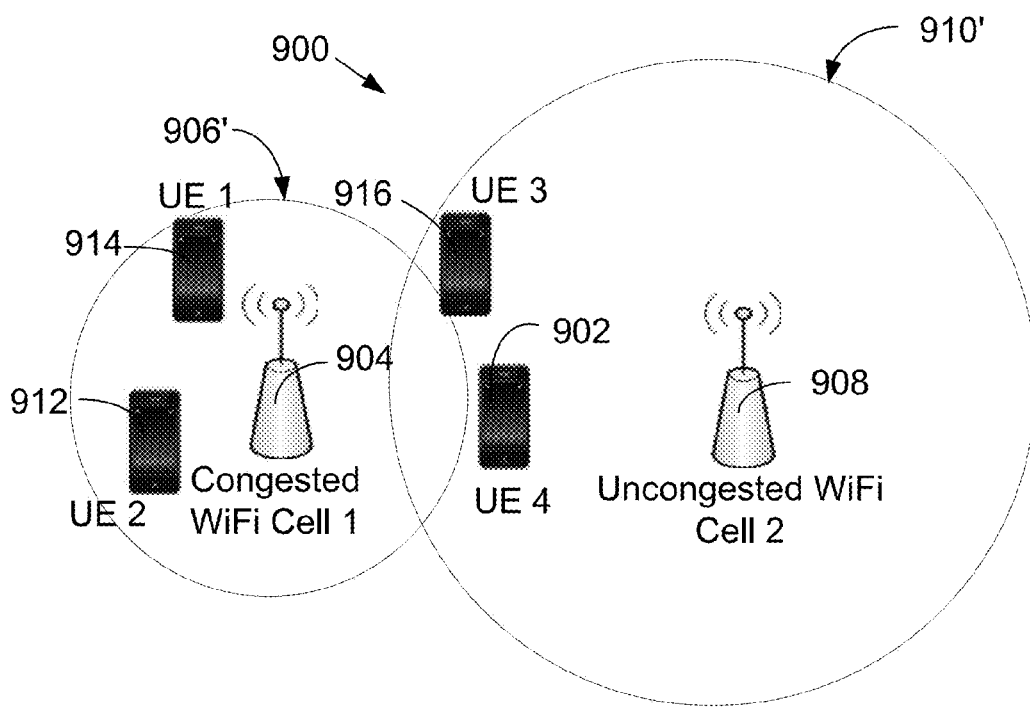

FIGS. 9A-B illustrate UE-assisted cell congestion detection and elimination. Referring to the system 900 of FIG. 9A, a UE 902 detects the congestion of one cell 904 having a first coverage area 906 and reports it to neighboring uncongested cells (e.g., cell 908 having coverage area 910) that may offload a portion of the congestion. UE-assisted cell detection may be faster due to the over-the-air cooperation between the UE 902 and the cells 904, 908. UE-assisted cell detection may have the additional advantage that an inter-cell wired infrastructure is not necessary because the UE communicates the information over-the-air between the cells 904, 908. Compared to direct over-the-air congestion detection at neighboring cells, UEs may have better visibility to congested cells than neighboring cells (e.g., cell 908) of the congested cell 904.

Each cell, e.g., the first cell 904 and the second cell 908 of FIG. 9A, may broadcast system resource usage and/or congestion station to help the UEs, e.g., UEs 902, 912, 914, 916) to recognize cell congestion and the cause for the congestion. In an example, a UE 902 detects one cell's congestion, e.g., a WiFi cell 906 with high channel medium utilization. The UE 902 may inform neighboring uncongested cell 908 or cells about the congested cell 904. The UE sends a "cell congestion detected" message 918 indicating the ID of the congested cell, the congestion reason, and/or suggested actions. For example, the suggested actions may include increasing transmit power and/or adjusting cell selection parameters by suggest levels or amounts for the uncongested cells. Cell selection parameters may include Qhyst and Qoffset in 3G intra-frequency cell selection.

After receiving the message 918, the neighboring uncongested cell 908 or cells may attempt to offload the traffic from congested cells by taking the suggested actions. Each congested cell 904 may send a confirmation message (not shown) to the UE 902 after taking the suggested actions. After receiving the confirmation message from at least one neighboring uncongested cell 908, the UE 902 may send a "coverage shrink" message (not shown) to the congested cell 904. The "coverage shrink" message may indicate suggested actions, including reducing transmit power and/or adjusting cell selection parameters by suggested amounts for the congested cell. Cell selection parameters may include Qhyst and Qoffset in 3G intra-frequency cell selection.

The procedure may iterate based on the UE's 902 detection of whether the congestion is relieved or not. The process iterates until the congestion is relieved. For example, based on feedback the UE 902 receives from the cells 904, 908, the UE 902 may continue to request congested cells to continue to shrink coverage, and/or for the uncongested cells may increase coverage.

At an earlier point of time illustrated in FIG. 9A, the first WiFi cell 904 has a coverage area 906 encompassing UEs 902, 912, 914, 916. The second WiFi cell 908 has a coverage area 910 that encompasses UE 902 only. Although the coverage areas 906, 910 of the first WiFi cell 904 and the second WiFi cell 908 overlap, the two cells cannot see each other. UE 902 falls in the overlapping coverage area and may receive service from the first cell 904 or the second cell 908. The first WiFi cell 904 may be congested with traffic and broadcasts a message including its full system resource usage and a congested state indication. The second WiFi cell 908 may be uncongested, for example using only 10% of its resources. The second WiFi cell 908 may broadcast a message indicating its low system resource usage with an uncongested state indication. UEs 912, 914, 916 receive the broadcast from the first WiFi cell. However, UEs 912, 914, 916 may not inform any neighboring cells because, for example, they are outside of the coverage area of any neighboring cells, including the second cell. UE 902 is in the coverage area of the second cell 908 and informs the second cell 908 of congestion at the first cell 904. UE 902 sends a "cell congestion detected" message with the identifier of the first cell 904 to the second WiFi cell 908. UE 902 also sends an indication that a maximum bandwidth has been reached at the first cell 904 as the reason for the congestion. UE 902 also includes a suggested action of increasing transmit power for the second cell 908. The second cell 908 receives the message from the UE 902. Based on a set of rules, the second cell 908 accepts the suggested actions.

Referring to FIG. 9B, the second cell 908 increases its transmit power and, accordingly, increases its coverage area 910'. After increasing its transmit power, the second cell 908 sends a confirmation message to UE 902. The coverage area of the second cell 908 now encompasses both UE 902 and UE 916. However UE 916 is still connected to the first cell because UE 916 is still in the coverage area 906 of the first cell 904. The UE 902 may instruct the first cell 904 to shrink its coverage area to unload traffic from UE 916. The UE 902 may send a "coverage shrink" message, with a suggested action to reduce transmit power, to the first cell 904. The first cell may reduce its transmit power by a predetermined margin or by an amount specified in the message or by the network, thereby shrinking its coverage area 906' to a smaller area than its earlier area 906.

In one aspect, after the second cell 908 increases its transmit power and the first cell 904 decreases its transmit power, UE 916 is inside the enlarged coverage area 910' of the second cell and is outside of the reduced coverage area 906' of the first cell 904. UE 916 is offloaded to the second cell. It should be appreciated that one or more additional terminals (not shown) may similarly be offloaded. After the offloading, the first cell 904 is no longer congested and broadcasts a message indicating it is not congested. UE 902 may receive the message and terminate its portion in the congestion-offloading process.

It should be appreciated that although FIGS. 9A-B show only two adjacent cells and non-directional coverage areas for simplicity of illustration, the technology is not limited thereby. For example, each cell may contemporaneously execute the process with all of its surrounding neighbors, and may use directional radiation to expand coverage in one direction while shrinking in another direction.

In another aspect illustrated, after the second cell increases its transmit power and the first cell decreases its transmit power, the first cell may still be congested as illustrated in FIG. 9A. For example, the enlargement and shrinkage of the respective coverage areas may not be enough to cause the desired amount of offloading to occur. The first cell 904 may repeat its broadcast of the indication of congestion in another broadcast message. UE 902 may detect that the first cell 904 is still in the congested state and iterate, or repeat, the procedure. The process may iterate for as many times as necessary until the first cell 904 is uncongested. UE 902 sends a message to the second cell 908 to increase its transmit power and sends a message to the first cell 902 to decrease its transmit power. After the second iteration, UE 916 may be offloaded to the second cell 908, as shown in FIG. 9B. The first cell 904 is no longer congested and broadcasts a message indicating it is not congested. UE 902 may receive the message and terminate its activity in the offloading process.

Figure 10:
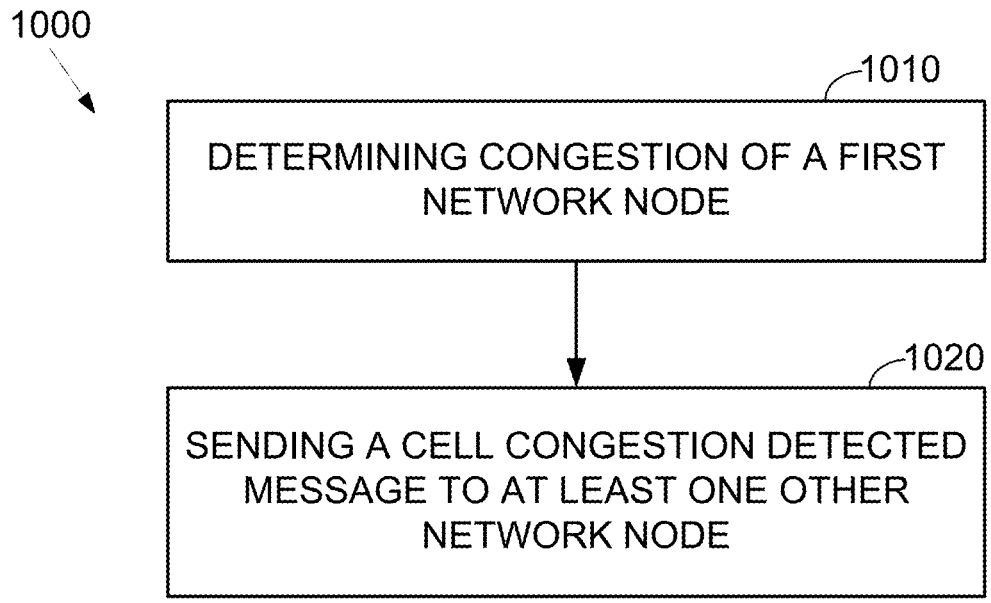
FIGS. 10-11 illustrate aspects of exemplary methodologies for UE-assisted cell congestion detection and elimination.

In accordance with the one or more aspects of the embodiments described herein (e.g., FIGS. 9A-B) with reference to FIG. 10, there is shown a methodology 1000, operable by a mobile entity, such as, for example, a UE, a mobile station, a terminal, an access terminal, a subscriber unit, a station, etc. Specifically, method 1000 describes a procedure for UE-assisted cell congestion detection and elimination. The method 1000 may involve, at 1010, determining congestion of a first network node. The method 1000 may involve, at 1020, sending a cell congestion detected message to at least one other network node.

Figure 11:
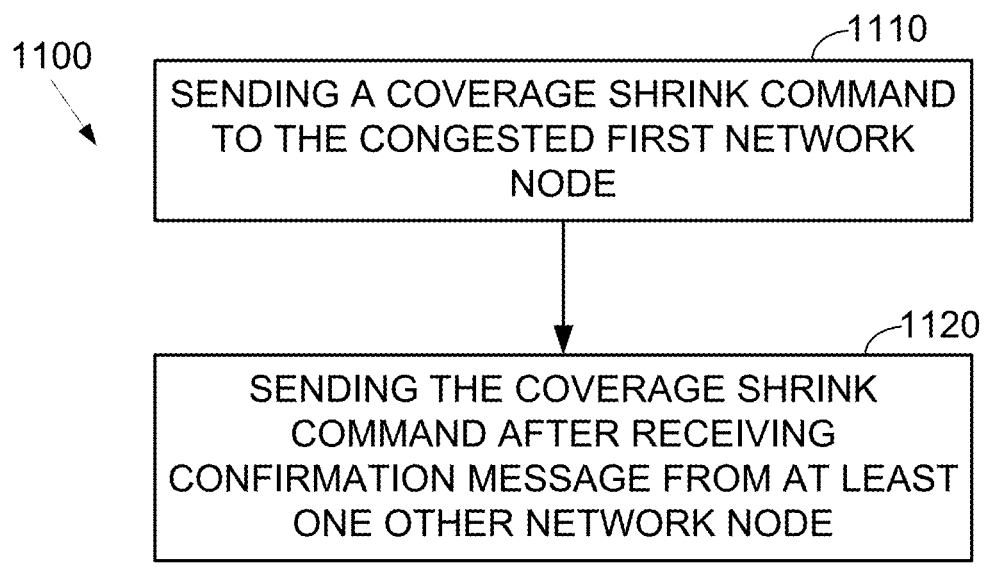

With reference to FIG. 11, there are shown further operations 1100 or aspects that are optional to method 1000 and may be performed by a mobile entity or the like. If the method 1000 includes at least one block of method 1100, then the method 1000 may terminate after the at least one block of method 1100, without necessarily having to include any subsequent downstream block(s) that may be illustrated. It is further noted that numbers of the blocks do not imply a particular order in which the blocks may be performed according to the method 1100. For example, the method 1100 may further include, at 1110, sending a coverage shrink command to the congested first network node. For example, the method 1100 may further include, at 1120, sending the coverage shrink command after receiving confirmation message from at least one other network node.

UE Organized Cell Backhaul Sharing

Figure 12:
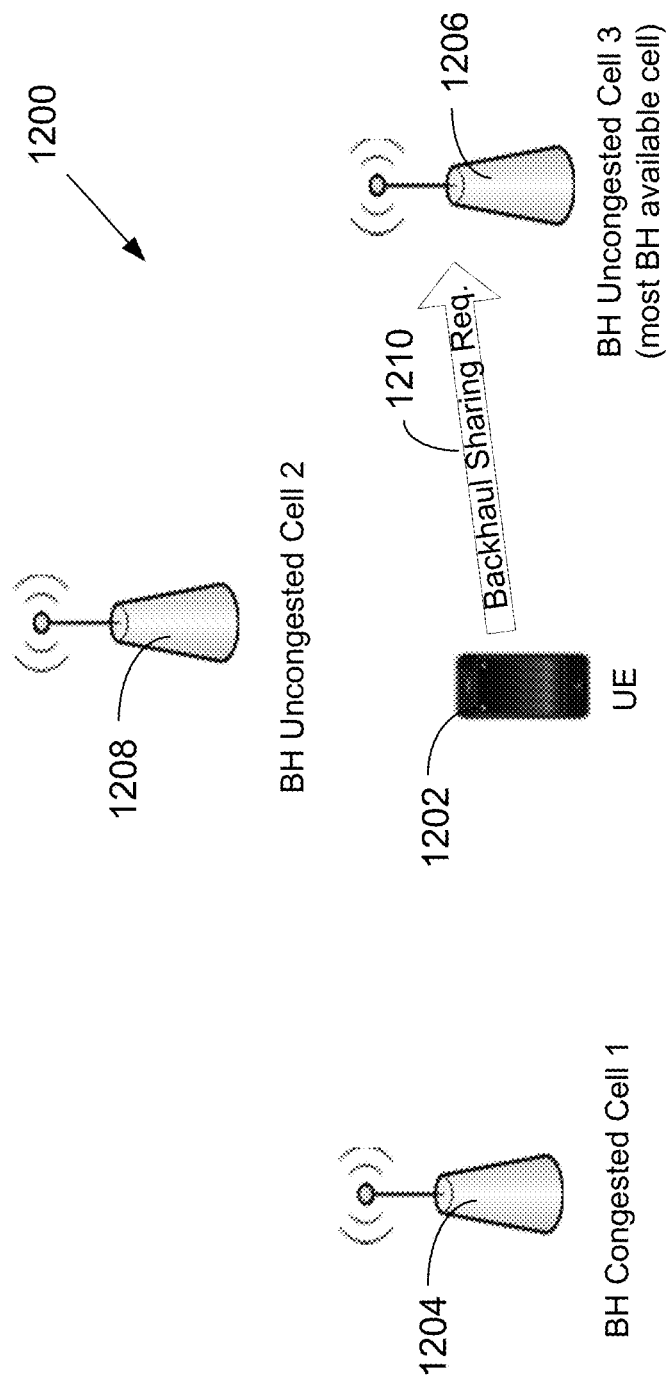
FIG. 12 illustrates UE organized cell backhaul sharing.

FIG. 12 illustrates a, example of a system 1200 including UE-organized cell backhaul sharing. A UE 1202 may detect a backhaul congested cell 1204 and may send a backhaul sharing request 1210 to a neighboring cell 1206 with the most available backhaul bandwidth. If the request is approved by the neighboring cell 1206, the UE 1202 may relay traffic from the congested cell 1204 to the cell 1206 with most available backhaul bandwidth. Compared with direct over-the-air inter-cell backhaul sharing, the UE may relay cell-to-cell traffic when cells cannot see each other directly.

In an example, each cell 1204, 1206, 1208 is assumed to broadcast its backhaul usage and/or backhaul congestion state to help the UE 1202 recognize backhaul congestion. A UE 1202 may detect the backhaul congestion of one cell 1204 based on its broadcast information and send a backhaul sharing query to the congested cell 1204. If the congested cell 1204 sends a positive response for the need of backhaul sharing, the UE 1202 may further request backhaul sharing from neighboring uncongested cells 1206, 1208. To optimize the sharing, the UE 1202 may first send a "backhaul sharing" request message 1210 to the cell 1206 with the most available backhaul bandwidth.

If the UE 1202 receives a positive response from the requested uncongested cell 1206, the UE may relay the backhaul traffic from the congested cell 1204 to the uncongested cell 1206. In one aspect, the UE 1202 may initiate the relay when the UE is in a battery charging state to conserve battery power. The UE data relay may be on an out-of-band spectrum other than the neighboring cells' serving spectrum to prevent interference.

In the example illustrated in FIG. 12, the UE 1202 is in the vicinity of cells 1204, 1203, 1208. The first cell 1204 has high traffic load, and the data traffic exceeds the available backhaul bandwidth of the first cell. The second cell 1208 has medium traffic load with some available backhaul bandwidth. The third cell 1206 has low traffic load with high available backhaul bandwidth. In this example, the third cell 1206 has more available backhaul bandwidth in comparison to the second cell. Each of cells 1204, 1203, 1208 may broadcast a message including each cell's backhaul usage and/or backhaul congestion state. The first cell 1204 may broadcast a message indicating high backhaul usage and a congested state for the backhaul. The second cell 1208 may broadcast a message indicating medium backhaul usage with an uncongested state for the backhaul. The third cell 1206 may broadcast a message indicating low backhaul usage with an uncongested state for the backhaul. The UE 1202 receives the broadcast messages from the each of the cells 1204, 1203, 1208.

The UE 1202 may determine that the first cell 1204 is congested based on the received broadcast message. Based on the broadcast messages from the second cell 1208 and the third cell 1206, the UE 1202 may determine that the second cell 1208 and the third cell 1206 have available backhaul bandwidth and that the third cell 1206 has more available backhaul bandwidth than the second cell 1208. The UE 1202 may send a backhaul sharing message to the first cell 1204 to query whether the first cell 1204 desires to offload backhaul traffic. At the first cell 1204, the cell may determine that backhaul offloading is desired, e.g., based on initial configuration or a network rule. The first cell 1204 may respond to the UE 1202 with a positive acknowledgement. After receiving the positive acknowledgment, the UE 1202 selects the cell with the most available backhaul bandwidth, which is the third cell 1206 in this example. The UE 1202 may send a "backhaul sharing" request message 1210 to the third cell 1206. The message indicates the source of the traffic, which is the first cell in this case. The third cell 1206 may determine whether to grant the backhaul sharing.

In one aspect, the third cell 1206 may determine to grant the request and sends a positive acknowledgement to the UE 1202. The UE 1202 may indicate to the first cell 1204 that data relay may begin. The UE 1202 may send a message to the first cell 1204 to initiate data relay. Data is relayed to the third cell 1206 via the UE 1202. The UE 1202 may use out-of-band spectrum to prevent interference. The UE 1202 may determine that it is in a charging state and commence data relay contingent on being in a charging state.

In another aspect, the third cell 1206 may determine not to grant the request and send a negative acknowledgement to the UE 1202. The UE 1202 may determine that another cell, for example the second cell 1208, has available backhaul bandwidth. The UE 1202 may send a "backhaul sharing" request message (not shown) to the second cell 1208. The message indicates the source of the traffic, which is the first cell 1204 in this case. The second cell 1208 may determine whether to grant the backhaul sharing. The second cell 1208 may determine to grant the request and send a positive acknowledgement to the UE 1202. The UE 1202 may indicate to the first cell 1204 that data relay may begin. The UE 1202 may send a message to the first cell 1204 to initiate data relay. Data may be relayed to the second cell via the UE 1202. The UE 1202 may use out-of-band spectrum to prevent interference. The UE 1202 may determine that it is in a charging state and commence data relay based on the determination.

Figure 13:
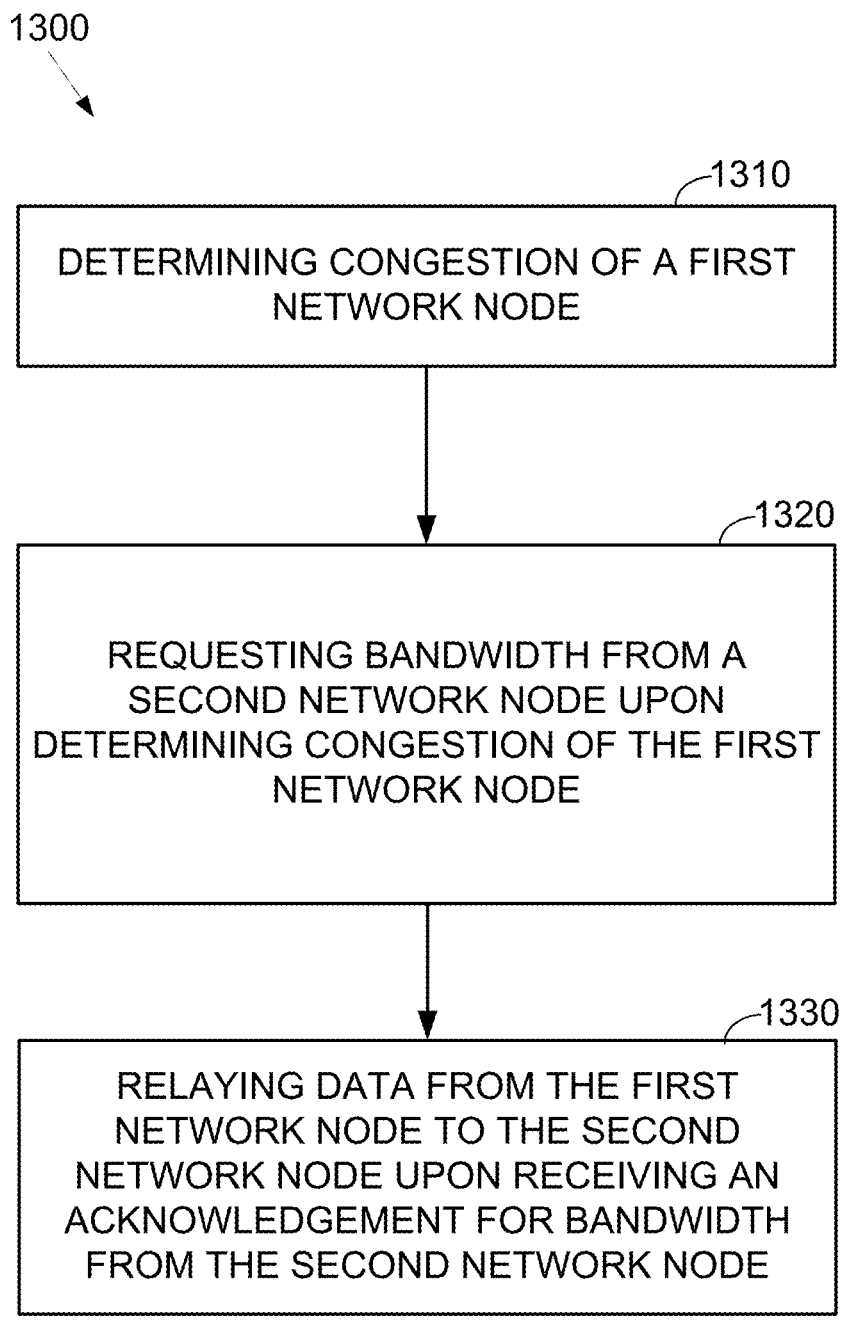
FIGS. 13-14 illustrate methodologies for UE organized cell backhaul sharing.

In accordance with the one or more aspects of the embodiments described herein (e.g., FIG. 12) with reference to FIG. 13, there is shown a methodology 1300, operable by a mobile entity, such as, for example, a UE, a mobile station, a terminal, an access terminal, a subscriber unit, a station, or the like. Specifically, method 1300 describes a procedure for UE organized cell backhaul sharing. The method 1300 may involve, at 1310, determining congestion of a first network node. The method 1300 may involve, at 1320, requesting bandwidth from a second network node upon determining congestion of the first network node. The method 1300 may involve, at 1330, relaying data from the first network node to the second network node upon receiving an acknowledgement for bandwidth from the second network node.

Figure 14:
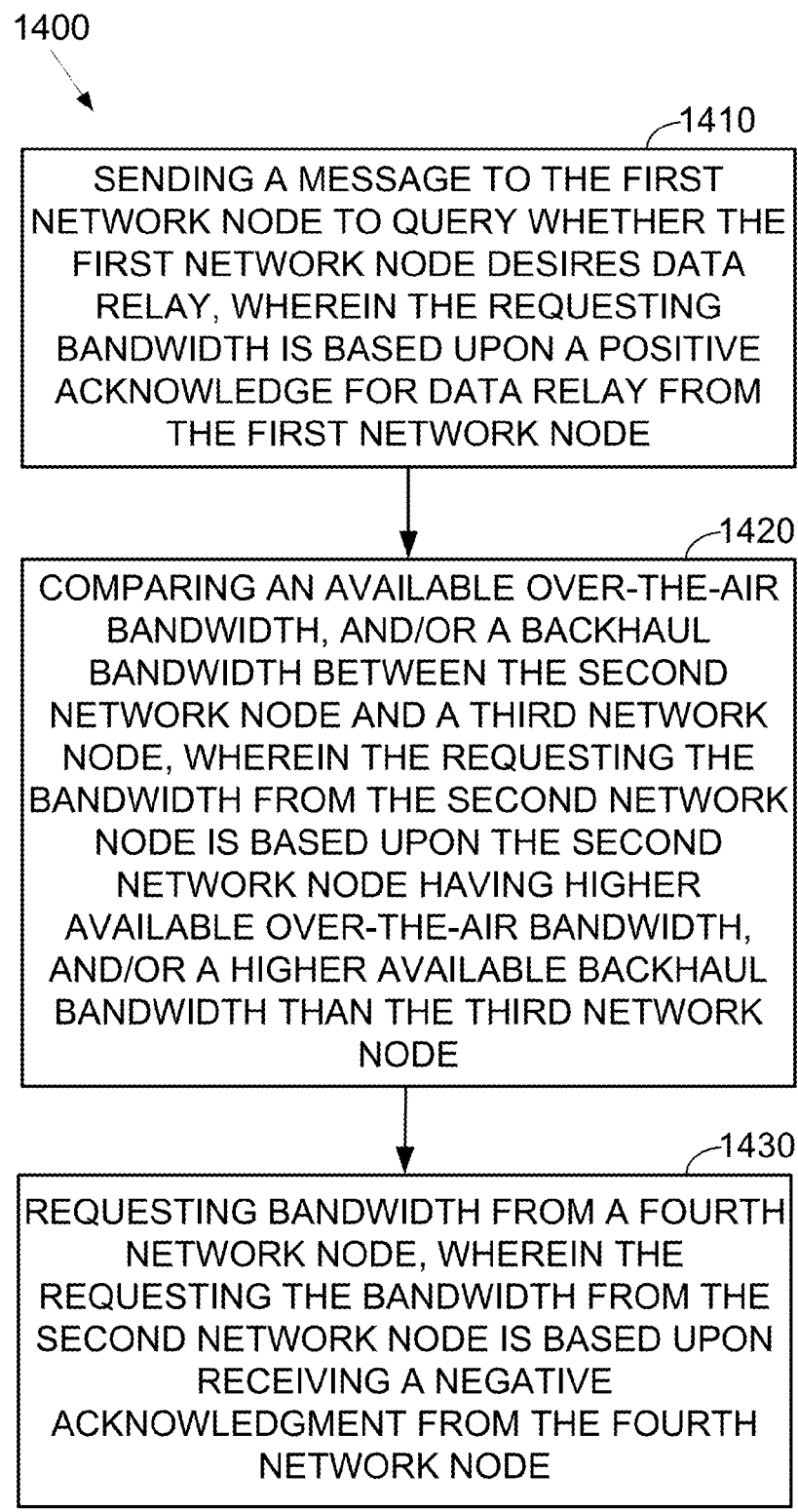

With reference to FIG. 14, there are shown further operations 1400 or aspects that are optional to method 1300 and may be performed by a mobile entity or the like. If the method 1300 includes at least one block of method 1400, then the method 1300 may terminate after the at least one block of method 1400, without necessarily having to include any subsequent downstream block(s) that may be illustrated. It is further noted that numbers of the blocks do not imply a particular order in which the blocks may be performed according to the method 1400. For example, the method 1400 may further include, at 1410, sending a message to the first network node to query whether the first network node desires data relay, wherein the requesting bandwidth is based upon a positive acknowledge for data relay from the first network node. For example, the method 1400 may further include, at 1420, comparing an available over-the-air bandwidth, and/or a backhaul bandwidth between the second network node and a third network node, wherein the requesting the bandwidth from the second network node is based upon the second network node having higher available over-the-air bandwidth, and/or a higher available backhaul bandwidth than the third network node. For example, the method 1400 may further include, at 1430, requesting bandwidth from a fourth network node, wherein the requesting the bandwidth from the second network node is based upon receiving a negative acknowledgment from the fourth network node.

Exemplary Embodiments

Figure 15:
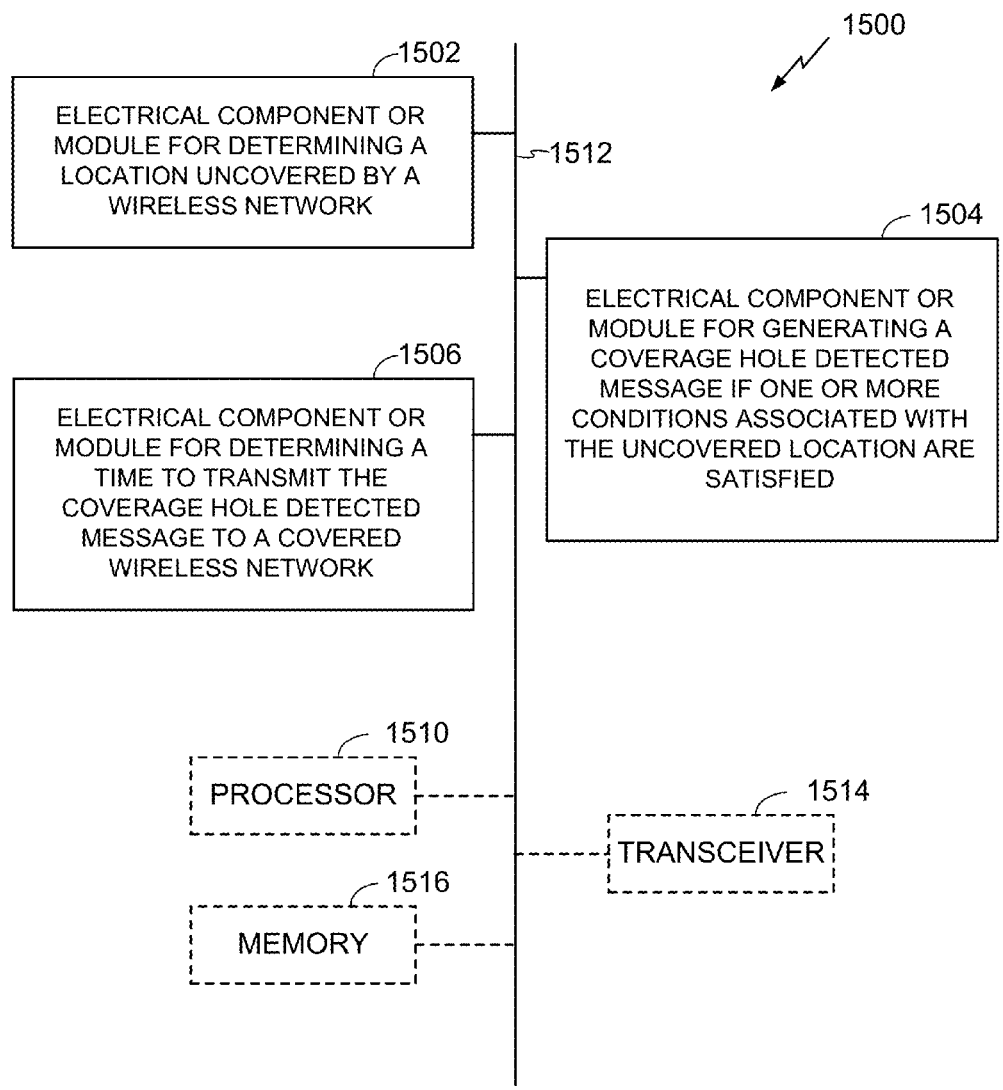
FIG. 15 shows an embodiment of an apparatus for UE-assisted coverage hole detection and elimination, in accordance with the methodology of FIG. 7.

FIG. 15 shows an embodiment of an apparatus for UE-assisted coverage hole detection and elimination, in accordance with the methodology of FIG. 7. With reference to FIG. 15, there is provided an exemplary apparatus 1500 that may be configured as a mobile entity (e.g., a UE, a mobile station, a terminal, an access terminal, a subscriber unit, a station, or the like) in a wireless network, or as a processor or similar device/component for use within the mobile entity. The apparatus 1500 may include functional blocks that can represent functions implemented by a processor, software, or combination thereof (e.g., firmware). For example, apparatus 1500 may include an electrical component or module 1502 for determining a location uncovered by a wireless network. The apparatus 1500 may include an electrical component or module 1504 for generating a coverage hole detected message if one or more conditions associated with the uncovered location are satisfied. The apparatus 1500 may include an electrical component or module 1506 for determining a time to transmit the coverage hole detected message to a covered wireless network. Each of the components 1502, 1504, 1506 may comprise means for performing the respective illustrated functions, including, for example, a processor in a mobile entity or the like performing corresponding ones of the more detailed algorithms described for a mobile entity/UE in connection with FIGS. 6A-B above.

In related aspects, the apparatus 1500 may optionally include a processor component 1510 having at least one processor, in the case of the apparatus 1500 configured as a mobile entity (e.g., a UE, a mobile station, a terminal, an access terminal, a subscriber unit, a station, or the like), rather than as a processor. The processor 1510, in such case, may be in operative communication with the components 1502-1506 via a bus 1512 or similar communication coupling. The processor 1510 may effect initiation and scheduling of the processes or functions performed by electrical components 1502-1506.

In further related aspects, the apparatus 1500 may include a radio transceiver component 1514. A stand alone receiver and/or stand alone transmitter may be used in lieu of or in conjunction with the transceiver 1514. When the apparatus 1500 is a network entity, the apparatus 1500 may also include a network interface (not shown) for connecting to one or more core network entities. The apparatus 1500 may optionally include a component for storing information, such as, for example, a memory device/component 1516. The computer readable medium or the memory component 1516 may be operatively coupled to the other components of the apparatus 1500 via the bus 1512 or the like. The memory component 1516 may be adapted to store computer readable instructions and data for effecting the processes and behavior of the components 1502-1506, and subcomponents thereof, or the processor 1510, or the methods disclosed herein. The memory component 1516 may retain instructions for executing functions associated with the components 1502-1506. While shown as being external to the memory 1516, it is to be understood that the components 1502-1506 can exist within the memory 1516. It is further noted that the components in FIG. 15 may comprise processors, electronic devices, hardware devices, electronic sub-components, logical circuits, memories, software codes, firmware codes, etc., or any combination thereof.

Figure 16:
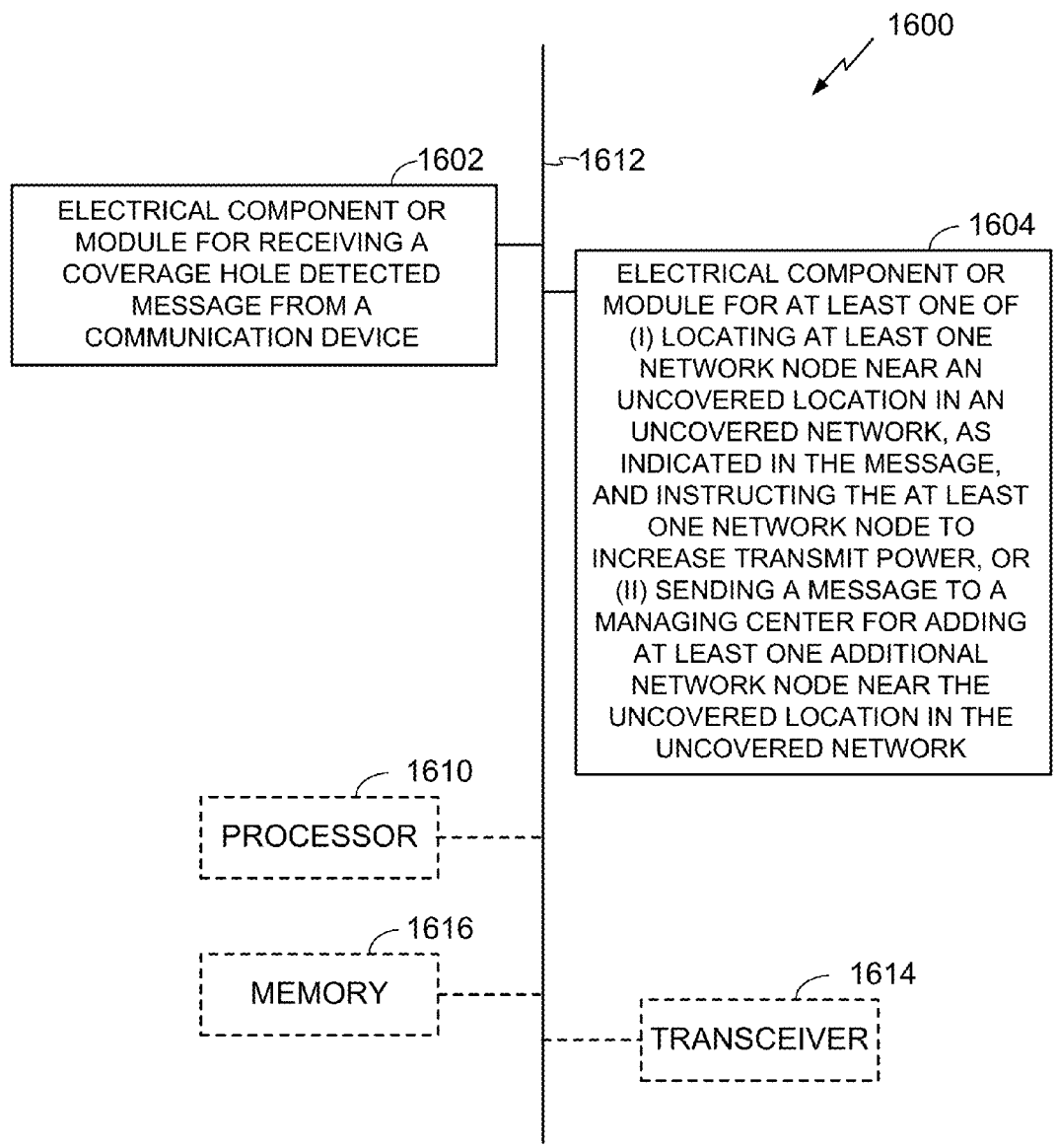
FIG. 16 shows an embodiment of an apparatus for UE-assisted coverage hole detection and elimination, in accordance with the methodology of FIG. 8.

FIG. 16 shows an embodiment of an apparatus for UE-assisted coverage hole detection and elimination, in accordance with the methodology of FIG. 8. With reference to FIG. 16, there is provided an exemplary apparatus 1600 that may be configured as a network entity (e.g., a femocell, a macrocell, a picocell, or other cell) in a wireless network, or as a processor or similar device/component for use within the network entity. The apparatus 1600 may include functional blocks that can represent functions implemented by a processor, software, or combination thereof (e.g., firmware). For example, apparatus 1600 may include an electrical component or module 1602 for receiving a coverage hole detected message from a communication device. The apparatus 1600 may include an electrical component or module 1604 for performing at least one of (i) locating at least one network node near an uncovered location in an uncovered network, as indicated in the message, and instructing the at least one network node to increase transmit power, or (ii) sending a message to a managing center for adding at least one additional network node near the uncovered location in the uncovered network. Each of the components 1602 and 1604 may comprise means for performing the respective illustrated functions, including, for example, a processor in a base station or the like performing corresponding ones of the more detailed algorithms for a base station/eNB described in connection with FIGS. 6A-B above.

In related aspects, the apparatus 1600 may optionally include a processor component 1610 having at least one processor, in the case of the apparatus 1600 configured as a network entity (e.g., a femocell, a macrocell, a picocell, or the like), rather than as a processor. The processor 1610, in such case, may be in operative communication with the components 1602-1604 via a bus 1612 or similar communication coupling. The processor 1610 may effect initiation and scheduling of the processes or functions performed by electrical components 1602-1604.

In further related aspects, the apparatus 1600 may include a radio transceiver component 1614. A stand alone receiver and/or stand alone transmitter may be used in lieu of or in conjunction with the transceiver 1614. When the apparatus 1600 is a network entity, the apparatus 1600 may also include a network interface (not shown) for connecting to one or more core network entities. The apparatus 1600 may optionally include a component for storing information, such as, for example, a memory device/component 1616. The computer readable medium or the memory component 1616 may be operatively coupled to the other components of the apparatus 1600 via the bus 1612 or the like. The memory component 1616 may be adapted to store computer readable instructions and data for effecting the processes and behavior of the components 1602-1604, and subcomponents thereof, or the processor 1610, or the methods disclosed herein. The memory component 1616 may retain instructions for executing functions associated with the components 1602-1604. While shown as being external to the memory 1616, it is to be understood that the components 1602-1604 can exist within the memory 1616. It is further noted that the components in FIG. 16 may comprise processors, electronic devices, hardware devices, electronic sub-components, logical circuits, memories, software codes, firmware codes, etc., or any combination thereof.

Figure 17:
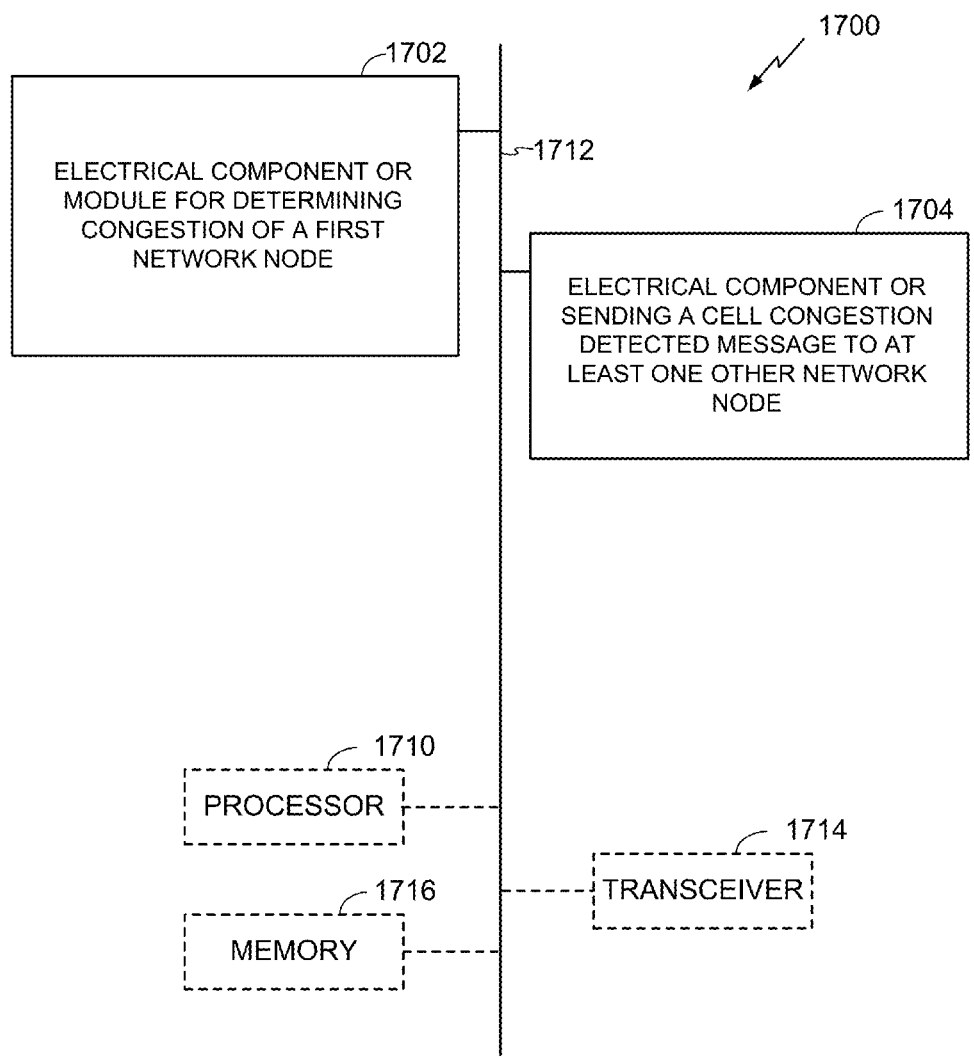
FIG. 17 shows an embodiment of an apparatus for UE-assisted cell congestion detection and elimination, in accordance with the methodology of FIG. 10.

FIG. 17 shows an embodiment of an apparatus for UE-assisted coverage hole detection and elimination, in accordance with the methodology of FIG. 10. With reference to FIG. 17, there is provided an exemplary apparatus 1700 that may be configured as a mobile entity (e.g., a UE, a mobile station, a terminal, an access terminal, a subscriber unit, a station, or the like) in a wireless network, or as a processor or similar device/component for use within the mobile entity. The apparatus 1700 may include functional blocks that can represent functions implemented by a processor, software, or combination thereof (e.g., firmware). For example, apparatus 1700 may include an electrical component or module 1702 for determining congestion of a first network node. The apparatus 1700 may include an electrical component or module 1704 for sending a cell congestion detected message to at least one other network node. Each of the components 1702 and 1704 may comprise means for performing the respective illustrated functions, including, for example, a processor in a mobile entity or the like performing corresponding ones of the more detailed algorithms described for a mobile entity/UE in connection with FIGS. 9A-B above.

In related aspects, the apparatus 1700 may optionally include a processor component 1710 having at least one processor, in the case of the apparatus 1700 configured as a mobile entity (e.g., a UE, a mobile station, a terminal, an access terminal, a subscriber unit, a station, or the like), rather than as a processor. The processor 1710, in such case, may be in operative communication with the components 1702-1704 via a bus 1712 or similar communication coupling. The processor 1710 may effect initiation and scheduling of the processes or functions performed by electrical components 1702-1704.

In further related aspects, the apparatus 1700 may include a radio transceiver component 1714. A stand alone receiver and/or stand alone transmitter may be used in lieu of or in conjunction with the transceiver 1714. When the apparatus 1700 is a network entity, the apparatus 1700 may also include a network interface (not shown) for connecting to one or more core network entities. The apparatus 1700 may optionally include a component for storing information, such as, for example, a memory device/component 1716. The computer readable medium or the memory component 1716 may be operatively coupled to the other components of the apparatus 1700 via the bus 1712 or the like. The memory component 1716 may be adapted to store computer readable instructions and data for effecting the processes and behavior of the components 1702-1704, and subcomponents thereof, or the processor 1710, or the methods disclosed herein. The memory component 1716 may retain instructions for executing functions associated with the components 1702-1704. While shown as being external to the memory 1716, it is to be understood that the components 1702-1704 can exist within the memory 1716. It is further noted that the components in FIG. 17 may comprise processors, electronic devices, hardware devices, electronic sub-components, logical circuits, memories, software codes, firmware codes, etc., or any combination thereof.

Figure 18:
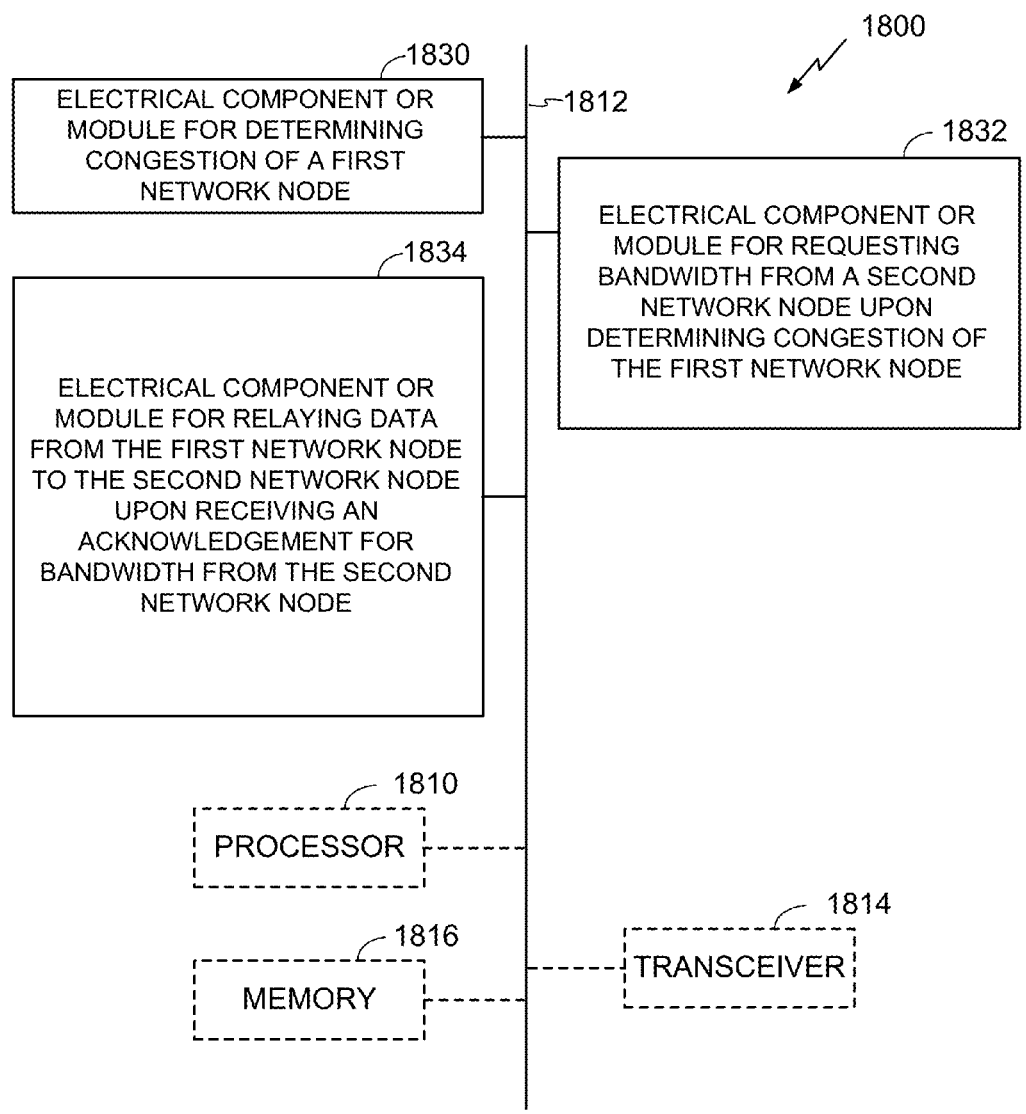
FIG. 18 shows an embodiment of an apparatus for UE organized cell backhaul sharing, in accordance with the methodology of FIG. 13.

FIG. 18 shows an embodiment of an apparatus for UE-assisted coverage hole detection and elimination, in accordance with the methodology of FIG. 11. With reference to FIG. 18, there is provided an exemplary apparatus 1800 that may be configured as a mobile entity (e.g., a UE, a mobile station, a terminal, an access terminal, a subscriber unit, a station, or the like) in a wireless network, or as a processor or similar device/component for use within the mobile entity. The apparatus 1800 may include functional blocks that can represent functions implemented by a processor, software, or combination thereof (e.g., firmware). For example, apparatus 1800 may include an electrical component or module 1802 for determining congestion of a first network node, for example, congestion in traffic from the node via a backhaul link. The apparatus 1800 may include an electrical component or module 1804 for requesting bandwidth from a second network node upon determining congestion of the first network node, for example, unused bandwidth in a wireless backhaul of the second network node. The apparatus 1800 may include an electrical component or module 1806 for relaying data from the first network node to the second network node upon receiving an acknowledgement for bandwidth from the second network node. Each of the components 1802, 1804, 1806 may comprise means for performing the respective illustrated functions, including, for example, a processor in a mobile entity or the like performing corresponding ones of the more detailed algorithms described for a mobile entity/UE in connection with FIG. 12 above.

In related aspects, the apparatus 1800 may optionally include a processor component 1810 having at least one processor, in the case of the apparatus 1800 configured as a mobile entity (e.g., a UE, a mobile station, a terminal, an access terminal, a subscriber unit, a station, or the like), rather than as a processor. The processor 1810, in such case, may be in operative communication with the components 1802-1206 via a bus 1812 or similar communication coupling. The processor 1810 may effect initiation and scheduling of the processes or functions performed by electrical components 1802-1206.

In further related aspects, the apparatus 1800 may include a radio transceiver component 1814. A stand alone receiver and/or stand alone transmitter may be used in lieu of or in conjunction with the transceiver 1814. When the apparatus 1800 is a network entity, the apparatus 1800 may also include a network interface (not shown) for connecting to one or more core network entities. The apparatus 1800 may optionally include a component for storing information, such as, for example, a memory device/component 1816. The computer readable medium or the memory component 1816 may be operatively coupled to the other components of the apparatus 1800 via the bus 1812 or the like. The memory component 1816 may be adapted to store computer readable instructions and data for effecting the processes and behavior of the components 1802-1206, and subcomponents thereof, or the processor 1810, or the methods disclosed herein. The memory component 1816 may retain instructions for executing functions associated with the components 1802-1206. While shown as being external to the memory 1816, it is to be understood that the components 1802-1206 can exist within the memory 1816. It is further noted that the components in FIG. 18 may comprise processors, electronic devices, hardware devices, electronic sub-components, logical circuits, memories, software codes, firmware codes, etc., or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc wherein disks usually hold magnetically encoded data, while discs hold optically encoded data. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for user equipment (UE) communication device assisted coverage hole detection, the method comprising:
    determining, by the UE, a coverage hole resulting from a location uncovered by a wireless network;
    determining if one or more conditions associated with the uncovered location are satisfied;
    preventing generation, by the UE, of a coverage hole detected message if the one or more conditions is determined not to be satisfied despite the determining a coverage hole by the UE;
    generating, by the UE, the coverage hole detected message if the one or more conditions associated with the uncovered location are determined to be satisfied; and
    determining a time to transmit the coverage hole detected message to a covered wireless network if the coverage hole detected message is generated by the UE.

2. The method of claim 1, wherein the UE comprises a mobile node.

3. The method of claim 1, wherein the wireless network associated with the uncovered location has a unique network identity and includes one or both of a public land mobile network and a WiFi network.

4. The method of claim 1, wherein the determining the coverage hole resulting from the location uncovered by the wireless network comprises at least one of determining if an associated network signal strength is below a first threshold or determining if service quality including data throughput measured at the UE is below a second threshold.

5. The method of claim 1, wherein the coverage hole detected message comprises at least an uncovered network identity and uncovered location information.

6. The method of claim 1, wherein the one or more conditions for generating the coverage hole detected message include at least one of:
    traffic demand of the UE at the uncovered location being above a first threshold; or
    duration of the UE staying at the uncovered location being above a second threshold.

7. The method of claim 6, wherein the traffic demand is measured by a number of calls initiated at the uncovered location.

8. The method of claim 6, wherein the duration that the UE stays at the uncovered location is estimated via at least one of an accelerometer of the UE, GPS, or connected small cell identities.

9. The method of claim 1, wherein the time to transmit the coverage hole detected message is determined if one or more following conditions are satisfied:
    battery life of the UE is above a threshold; or
    the covered wireless network is detected by the UE.

10. The method of claim 1, wherein determining the time to transmit the coverage hole detected message comprises determining based on a time associated with a low load at the covered wireless network.

11. A wireless user equipment (UE) communication apparatus comprising:
    at least one processor of the UE configured to: determine a coverage hole resulting from a location uncovered by a wireless network, determine if one or more conditions associated with the uncovered location are satisfied, prevent generation, by the UE, of a coverage hole detected message if the one or more conditions is determined not to be satisfied despite the determining a coverage hole by the UE, generate the coverage hole detected message if the one or more conditions associated with the uncovered location are determined to be satisfied, and determine a time to transmit the coverage hole detected message to a covered wireless network if the coverage hole detected message is generated by the UE; and a memory coupled to the at least one processor for storing data.

12. The apparatus of claim 11, wherein the one or more conditions for generating the coverage hole detected message include at least one of:
    traffic demand of the UE at the uncovered location being above a first threshold; or
    duration of the UE staying at the uncovered location being above a second threshold.

13. A wireless user equipment (UE) communication apparatus comprising:
    means for determining, by the UE, a coverage hole resulting from a location uncovered by a wireless network;
    means for determining if one or more conditions associated with the uncovered location are satisfied;
    means for preventing generation, by the UE, of a coverage hole detected message if the one or more conditions is determined not to be satisfied despite the determining a coverage hole by the UE;
    means for generating, by the UE, the coverage hole detected message if the one or more conditions associated with the uncovered location are determined to be satisfied; and
    means for determining a time to transmit the coverage hole detected message to a covered wireless network if the coverage hole detected message is generated by the UE.

14. The apparatus of claim 13, wherein the one or more conditions for generating the coverage hole detected message include at least one of:
    traffic demand of the UE at the uncovered location being above a first threshold; or
    duration of the UE staying at the uncovered location being above a second threshold.

15. A non-transitory computer-readable medium comprising code for causing at least one computer to:
    determine, by a user equipment (UE), a coverage hole resulting from a location uncovered by a wireless network, determine if one or more conditions associated with the uncovered location are satisfied, prevent generation, by the UE, of a coverage hole detected message if the one or more conditions is determined not to be satisfied despite the determining a coverage hole by the UE, generate, by the UE, the coverage hole detected message if the one or more conditions associated with the uncovered location are determined to be satisfied, and determine a time to transmit the coverage hole detected message to a covered wireless network if the coverage hole detected message is generated by the UE.

16. The apparatus of claim 15, wherein the one or more conditions for generating the coverage hole detected message include at least one of:
    traffic demand of the UE at the uncovered location being above a first threshold; or
    duration of the UE staying at the uncovered location being above a second threshold.

17. A method for user equipment (UE) assisted coverage hole detection by a network node in a covered wireless network, the method comprising:
    receiving a coverage hole detected message from the (UE), the coverage hole detected message having been generated by the UE upon determining a coverage hole resulting from a location uncovered by a wireless network and if one or more conditions associated with the uncovered location are satisfied, wherein the one or more conditions are different than parameters used by the UE in determining the coverage hole; and
    at least one of (i) locating at least one network node near the uncovered location in the wireless network, as indicated in the coverage hole detected message, and instructing the at least one network node to increase transmit power, or (ii) sending a message to a managing center for adding at least one additional network node near the uncovered location in the wireless network.

18. A wireless communication apparatus comprising:
    a receiver configured to receive a coverage hole detected message from a user equipment (UE) communication device, the coverage hole detected message having been generated by the UE upon determining a coverage hole resulting from a location uncovered by a wireless network and if one or more conditions associated with the uncovered location are satisfied, wherein the one or more conditions are different than parameters used by the UE in determining the coverage hole;
    at least one processor, coupled to the receiver, configured for at least one of (i) locating at least one network node near the uncovered location in the wireless network, as indicated in the coverage hole detected message, and instructing the at least one network node to increase transmit power, or (ii) sending a message to a managing center for adding at least one additional network node near the uncovered location in the wireless network; and
    a memory coupled to the at least one processor for storing data.

19. A wireless communication apparatus comprising:
    means for receiving a coverage hole detected message from a user equipment (UE) communication device, the coverage hole detected message having been generated by the UE upon determining a coverage hole resulting from a location uncovered by a wireless network and if one or more conditions associated with the uncovered location are satisfied, wherein the one or more conditions are different than parameters used by the UE in determining the coverage hole;
    means for at least one of (i) locating at least one network node near the uncovered location in the wireless network, as indicated in the coverage hole detected message, and instructing the at least one network node to increase transmit power, or (ii) sending a message to a managing center for adding at least one additional network node near the uncovered location in the wireless network.

20. A non-transitory computer-readable medium comprising code for causing at least one computer to:
    receive a coverage hole detected message from a user equipment (UE) communication device, the coverage hole detected message having been generated by the UE upon determining a coverage hole resulting from a location uncovered by a wireless network and if one or more conditions associated with the uncovered location are satisfied, wherein the one or more conditions are different than parameters used by the UE in determining the coverage hole; and
at least one of (i) locate at least one network node near the uncovered location in the wireless network, as indicated in the coverage hole detected message, and instructing the at least one network node to increase transmit power, or (ii) send a message to a managing center for adding at least one additional network node near the uncovered location in the wireless network.

* * * * *